US012701053B2

(12) United States Patent
Mwanje

(10) Patent No.: US 12,701,053 B2
(45) Date of Patent: Aug. 4, 2026

(54) ML CAPABILITY UPDATE

(71) Applicant: Nokia Solutions and Networks Oy, Espoo (FI)

(72) Inventor: Stephen Mwanje, Dorfen (DE)

(73) Assignee: Nokia Solutions and Networks Oy, Espoo (FI)

( * ) Notice: Subject to any disclaimer, the term of this patent is extended or adjusted under 35 U.S.C. 154(b) by 396 days.

(21) Appl. No.: 18/365,972

(22) Filed: Aug. 5, 2023

(65) Prior Publication Data

US 2024/0129203 A1 Apr. 18, 2024

(30) Foreign Application Priority Data

Aug. 5, 2022 (EP) ..................................... 22188961

(51) Int. Cl.
*H04L 41/16* (2022.01)
*H04W 24/02* (2009.01)

(52) U.S. Cl.
CPC ............. *H04L 41/16* (2013.01); *H04W 24/02* (2013.01)

(58) Field of Classification Search
None
See application file for complete search history.

(56) References Cited

U.S. PATENT DOCUMENTS

2021/0021494 A1 1/2021 Yao et al.
2023/0075810 A1 * 3/2023 Ho ........................ H04W 28/18

FOREIGN PATENT DOCUMENTS

WO 2022/060923 A1 3/2022
WO 2022/218519 A1 10/2022

OTHER PUBLICATIONS

"3rd Generation Partnership Project; Technical Specification Group Services and System Aspects; Management and orchestration; Artificial Intelligence / Machine Learning (AI/ML) management (Release 17)", 3GPP TS 28.105, V17.0.0, Jun. 2022, pp. 1-33.
"3rd Generation Partnership Project; Technical Specification Group Services and System Aspects; Intent driven management services for mobile networks (Release 17)", 3GPP TS 28.312, V17.0.1, Jun. 2022, pp. 1-52.
"3rd Generation Partnership Project; Technical Specification Group Services and System Aspects; Telecommunication management; Generic Network Resource Model (NRM) Integration Reference Point (IRP); Information Service (IS) (Release 17)", 3GPP TS 28.622, V17.2.0, Jun. 2022, pp. 1-86.
Extended European Search Report received for corresponding European Patent Application No. 22188961.1, dated Jan. 20, 2023, 9 pages.
"PCR TR 28.908 Add use case on AI/ML update", 3GPP TSG-SA5 Meeting #144-e, S5-224102, Agenda: 6.7.5.4, Huawei, Jun. 27-Jul. 1, 2022, 2 pages.
"PCR 28.908 AIML Update control", 3GPP TSG-SA5 Meeting #, S5-232975, Agenda: 6.7.5.2, Nokia, Feb. 2023, 4 pages.

* cited by examiner

*Primary Examiner* — Angela Nguyen
(74) *Attorney, Agent, or Firm* — Nokia Technologies Oy

(57) ABSTRACT

The present disclosure provides a method comprising monitoring, by an update service producer receives, for a request to update an artificial intelligence/machine learning capability influencing a network service, and instructing, by the update service producer, a first support function to update the artificial intelligence/machine learning capability to an update version when the request is received.

15 Claims, 11 Drawing Sheets

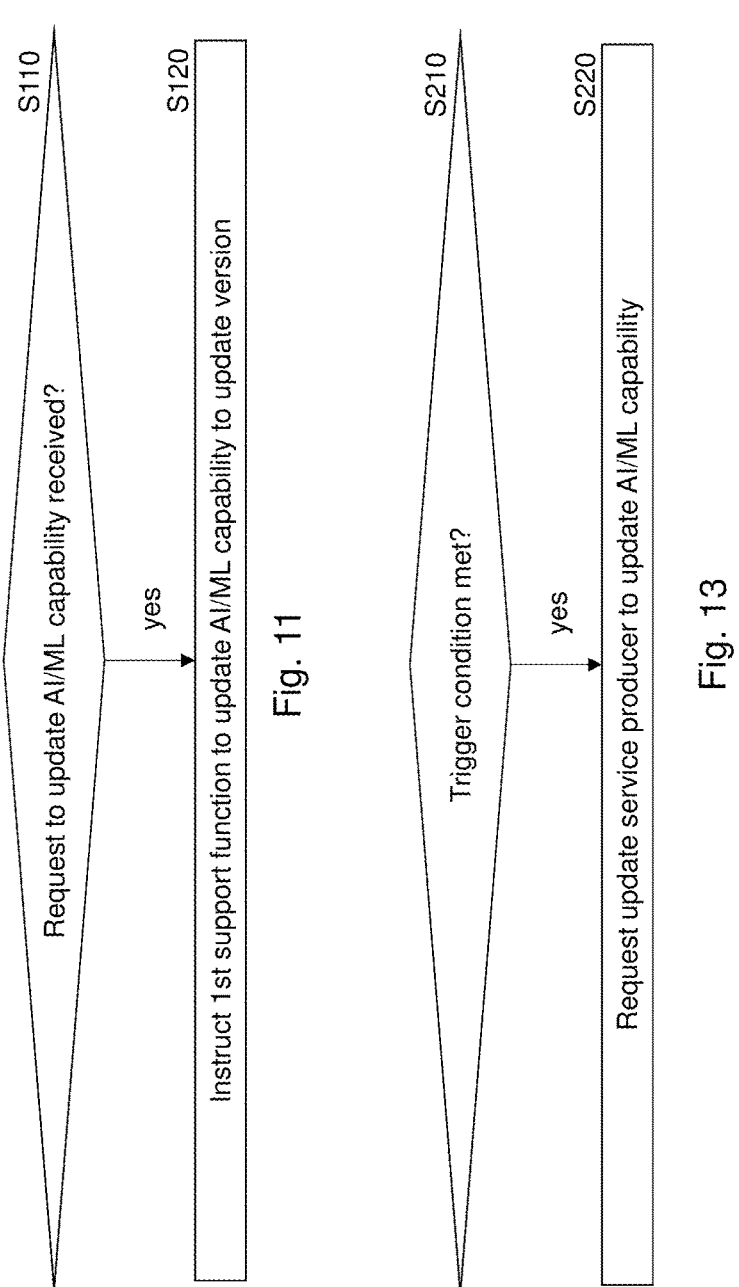
Fig. 11
Fig. 13
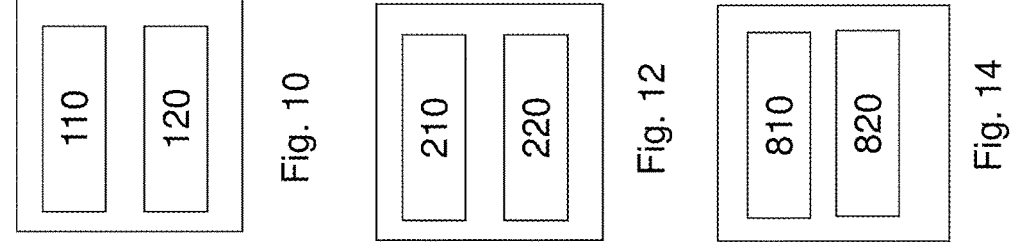
Fig. 10
Fig. 12
Fig. 14

ML CAPABILITY UPDATE

CROSS-REFERENCE TO RELATED APPLICATIONS

This patent application claims the benefit of priority of European Patent Office Patent Application No. filed Aug. 5, 2023, the contents of which are hereby incorporated by reference as if reproduced in their entirety.

TECHNICAL FIELD

The present disclosure relates to wireless communication systems, in particular to updating of AI/ML Capability of network functions of a wireless communication system.

Abbreviations

3GPP 3rd Generation Partnership Project
5G/6G/7G 5th/6th/7th Generation
AI Artificial Intelligence
AMF Access and Mobility Management Function
CAN Cognitive Autonomous Network
DSON Distributed SON
gNB NodeB of 5G RAN
ID Identifier
IOC Information Object Class
KPI Key Performance Indicator
MDAF Management Data Analytics Function
ML Machine Learning
MnS Management Service
MOI Managed Object Instance
NWDAF Network Data Analytics Function
OAM Operation, Administration, and Maintenance
RAN Radio Access Network
RL Reinforcement Learning
SA System Architecture
SON Self-Organizing Networks
TS Technical Specification

BACKGROUND

Cognitive Autonomous Networks (CAN) promise to provide intelligence and autonomy in network Operations, Administration and Management (OAM) as well as in the network procedures to support the increased flexibility and complexity of a radio network. Through use of Machine Learning (ML) and Artificial Intelligence (AI) in the Cognitive Functions, CAN may be able to: 1) take higher level goals and derive the appropriate performance targets, 2) learn from their environment and their individual or shared experiences therein, 3) learn to contextualize their operating conditions and, 4) learn their optimal behavior fitting to the specific environment and contexts. One use case for such cognitive automation is handover optimization.

Cognition (and CAN as described above) is expected to be achieved through the use of Artificial Intelligence/Machine Learning (AI/ML) implemented in both network functions and management functions of a wireless communication system (e.g., a 5G wireless communication system (5GS)) for undertaking analytics and decisions on different network aspects. The 3rd 3GPP SA5 and SA2 working groups are both standardizing AI/ML Capability intended to support production of analytics insight and decisions.

3GPP TS 28.105 specifies the Artificial Intelligence/ Machine Learning (AI/ML) management capabilities and services for 5GS where AI/ML is used. It also describes the functionality and service framework for AI/ML management. Based on the service-based management architecture, an AI/ML-enabled function has or is related to a producer of AI/ML Management services (also called the AI/ML MnS producer) which provides services that are consumed by one or more consumers of AI/ML Management services (also called the AI/ML MnS consumers).

Therein,

An AI/ML entity is either an AI/ML model or contains an AI/ML model and that can be managed as a single composite entity. Whereas the AI/ML model may be a mathematical function or an artefact that contains a mathematical function and meta data about the mathematical function. Herein, the term AI/ML Entity is used to refer to any of these variation of artefacts capable of making predictions using AI/ML logic.

The AI/ML-enabled function may be any network-related function that applies AI/ML to accomplish an objective of the network-related function. The AI/ML-enabled function may contain one or several AI/ML Entities and examples of network-related functions include:

management functions like Management data analytics function or Self-organizing network functions.

network functions of a core network for analytics such as the network data analytics function (NWDAF) or network functions of a core network which make decisions such as the access and mobility function (AMF)

RAN network functions (i.e., network functions of a RAN). Example of a RAN network function in a gNB for automation like DSON functions, or for call processing functions such as media access control functions The AI/ML MnS consumer may be a network operator or another management function of a 5GS that has interest in the AI/ML Entities contained within or the AI/ML Capability of the AI/ML-enabled function.

The AI/ML Capability is a set of characteristics and functionality (and typically only the inference-related functionality) that can be accomplished by the AI/ML-enabled function. The AI/ML capability may include:

data collection functionality, such as which sources are considered for decisions data formatting functionality, including the structure, variables and ordering of the data the characteristics of an AI/ML Entity such as a number of layer in a neural network and relations among the layers and parameters of the neural network the learning hyper-parameters of an AI/ML Entity such as the loss function used to train the AI/ML Entity and the data distributions among training dataset, validation dataset and testing dataset used to train, validate, and test the AI/ML Entity.

SUMMARY

According to a first aspect, there is provided an apparatus comprising: one or more processors and memory storing instructions that, when executed by the one or more processors, cause the apparatus to perform: monitoring whether an update service producer receives, from an update service consumer, a request to update an artificial intelligence/ machine learning capability influencing a network service; instructing a first support function to update the artificial intelligence/machine learning capability to an update version if the update service producer receives the request.

The instructions, when executed by the one or more processors, may further cause the apparatus to perform: providing an information on available one or more update versions of the artificial intelligence/machine learning capability to the update service consumer; checking whether the received request comprises an indication of one of the one or more update versions; wherein the instructions, when executed by the one or more processors, may cause the apparatus to perform the instructing the first support function to update the artificial intelligence/machine learning capability by instructing the first support function to update the artificial intelligence/machine learning capability to the indicated one of the one or more update versions if the request comprises the indication of the one of the one or more update versions.

The instructions, when executed by the one or more processors, may further cause the apparatus to perform: publishing, for each of the one or more update versions, an expected performance gain for the network service, wherein the expected performance gain is expected to be caused by updating the artificial intelligence/machine learning capability to the respective update version.

The instructions, when executed by the one or more processors, may cause the apparatus to perform: the instructing the first support function to update the artificial intelligence/machine learning capability by instructing the first support function to at least one of the following actions: downloading and installing a set of instructions of the update version; or downloading and applying a set of one or more parameters used by the update version.

The instructions, when executed by the one or more processors, may further cause the apparatus to perform: commanding a second support function to execute a training of the artificial intelligence/machine learning capability to obtain the respective at least one of the set of instructions of the update version and the set of one or more parameters used by the update version.

The instructions, when executed by the one or more processors, may further cause the apparatus to perform: checking whether the received request to update the artificial intelligence/machine learning capability comprises an indication of a performance threshold; deciding whether the network service is expected to perform better than the performance threshold due to the updating the artificial intelligence/machine learning capability to the update version if the request comprises the indication of the performance threshold; inhibiting the instructing the support function to update the artificial intelligence/machine learning capability with the update version if the network service is not expected to perform better than the performance threshold due to the updating the artificial intelligence/machine learning capability to the update version.

According to a second aspect, there is provided an apparatus comprising: one or more processors and memory storing instructions that, when executed by the one or more processors, cause the apparatus to perform: monitoring whether a trigger condition is met, wherein the trigger condition is related to at least one of the following: a network service, wherein the network service is influenced by an artificial intelligence/machine learning capability; a potential update of the artificial intelligence/machine learning capability; an update history of the artificial intelligence/machine learning capability; or requesting an update service producer to update the artificial intelligence/machine learning capability if the trigger condition is met.

The trigger condition may comprise at least one of the following: a performance of the network service is poorer than a performance threshold; a time period after requesting a previous update of the artificial intelligence/machine learning capability is longer than a time threshold; an indication that an update version of the artificial intelligence/machine learning capability is available; an indication that more update versions of the artificial intelligence/machine learning capability than a version threshold are available.

The instructions, when executed by the one or more processors, may further cause the apparatus to perform: monitoring if the update service consumer receives, from the update service producer, an information on available one or more update versions of the artificial intelligence/machine learning capability; selecting one of the one or more update versions if the update service consumer receives the information on the available one or more update versions of the artificial intelligence/machine learning capability; requesting the update service producer to update the artificial intelligence/machine learning capability to the selected one of the one or more update versions.

The instructions, when executed by the one or more processors, may further cause the apparatus to perform, for each of the one or more update versions, supervising whether the update service consumer receives a respective expected performance gain of the network service provided by the service consumer, wherein the respective expected performance gain is expected to be caused by updating the artificial intelligence/machine learning capability to the respective update version; and wherein the instructions, when executed by the one or more processors, cause the apparatus to perform the selecting by selecting the one of the one or more update versions based on the expected performance gains.

The instructions, when executed by the one or more processors, may cause the apparatus to perform: the selecting by selecting the one of the one or more update versions such that the expected performance gain is maximized.

The instructions, when executed by the one or more processors, may further cause the apparatus to perform: determining a first performance of the network service prior to the requesting to update the artificial intelligence/machine learning capability; supervising if a response to the requesting to update the artificial intelligence/machine learning capability is received, wherein the response indicates that the artificial intelligence/machine learning capability is updated; determining a second performance of the network service after the response is received; obtaining an actual performance gain of the network service based on the first performance and the second performance; reporting, to the update service producer, on the actual performance gain of the network service.

The network service may be provided by the update service consumer.

In the apparatus according to any of the first and second aspects, the network service may be influenced by the artificial intelligence/machine learning capability by at least one of the following: the artificial intelligence/machine learning capability provides analytics used by the network service; or the artificial intelligence/machine learning capability meets a decision to be followed by the network service.

According to a third aspect, there is provided a method comprising: monitoring whether an update service producer receives, from an update service consumer, a request to update an artificial intelligence/machine learning capability influencing a network service; instructing a first support function to update the artificial intelligence/machine learninging capability to an update version if the update service producer receives the request.

The method may further comprise: providing an information on available one or more update versions of the artificial intelligence/machine learning capability to the update service consumer; checking whether the received request comprises an indication of one of the one or more update versions; wherein the instructing the first support function to update the artificial intelligence/machine learning capability comprises instructing the first support function to update the artificial intelligence/machine learning capability to the indicated one of the one or more update versions if the request comprises the indication of the one of the one or more update versions.

The method may further comprise publishing, for each of the one or more update versions, an expected performance gain for the network service, wherein the expected performance gain is expected to be caused by updating the artificial intelligence/machine learning capability to the respective update version.

The instructing the first support function to update the artificial intelligence/machine learning capability may comprise instructing the first support function to at least one of the following actions: downloading and installing a set of instructions of the update version; or downloading and applying a set of one or more parameters used by the update version.

The method may further comprise commanding a second support function to execute a training of the artificial intelligence/machine learning capability to obtain the respective at least one of the set of instructions of the update version and the set of one or more parameters used by the update version.

The method may further comprise: checking whether the received request to update the artificial intelligence/machine learning capability comprises an indication of a performance threshold; deciding whether the network service is expected to perform better than the performance threshold due to the updating the artificial intelligence/machine learning capability to the update version if the request comprises the indication of the performance threshold; inhibiting the instructing the support function to update the artificial intelligence/machine learning capability with the update version if the network service is not expected to perform better than the performance threshold due to the updating the artificial intelligence/machine learning capability to the update version.

According to a fourth aspect, there is provided a method comprising: monitoring whether a trigger condition is met, wherein the trigger condition is related to at least one of the following: a network service, wherein the network service is influenced by an artificial intelligence/machine learning capability, or a potential update of the artificial intelligence/machine learning capability, or an update history of the artificial intelligence/machine learning capability; requesting an update service producer to update the artificial intelligence/machine learning capability if the trigger condition is met.

The trigger condition may comprise at least one of the following: a performance of the network service is poorer than a performance threshold; a time period after requesting a previous update of the artificial intelligence/machine learning capability is longer than a time threshold; an indication from the service producer that an update version of the artificial intelligence/machine learning capability is available; an indication from the service producer that more update versions of the artificial intelligence/machine learning capability than a version threshold are available.

The method may further comprise monitoring if the update service consumer receives, from the update service producer, an information on available one or more update versions of the artificial intelligence/machine learning capability; selecting one of the one or more update versions if the update service consumer receives the information on the available one or more update versions of the artificial intelligence/machine learning capability; requesting the update service producer to update the artificial intelligence/machine learning capability to the selected one of the one or more update versions.

The method may further comprise, for each of the one or more update versions, supervising whether the update service consumer receives a respective expected performance gain of the network service provided by the service consumer, wherein the respective expected performance gain is expected to be caused by updating the artificial intelligence/machine learning capability to the respective update version; and wherein the selecting comprises selecting the one of the one or more update versions based on the expected performance gains.

The selecting may comprise selecting the one of the one or more update versions such that the expected performance gain is maximized.

The method may further comprise determining a first performance of the network service prior to the requesting to update the artificial intelligence/machine learning capability; supervising if a response to the requesting to update the artificial intelligence/machine learning capability is received, wherein the response indicates that the artificial intelligence/machine learning capability is updated; determining a second performance of the network service after the response is received; obtaining an actual performance gain of the network service based on the first performance and the second performance; and reporting, to the update service producer, on the actual performance gain of the network service.

The network service may be provided by the update service consumer.

In the method according to any of the third and fourth aspects, the network service may be influenced by the artificial intelligence/machine learning capability by at least one of the following: the artificial intelligence/machine learning capability provides analytics used by the network service; or the artificial intelligence/machine learning capability meets a decision to be followed by the network service.

Each of the methods of the third and fourth aspects may be a method of updating an AI/ML capability.

According to a fifth aspect, there is provided a computer program product comprising a set of instructions which, when executed on an apparatus, is configured to cause the apparatus to carry out the method according to any of the third and fourth aspects. The computer program product may be embodied as a computer-readable medium or directly loadable into a computer.

According to some embodiments of the present disclosure, at least one of the following advantages may be achieved:

Some example embodiments of the present disclosure enable an authorized consumer to control and manage AI/ML capability update processes including updating an AI/ML Entity after training or before deployment.

Moreover they may also allow management functions to interact with AI/ML capability update functions to control the AI/ML capability update processes.

Updating of the AI/ML entity may be automized;

Performance of the network functions may be improved due to appropriate control by the AI/ML entity.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present disclosure which is to be taken in conjunction with the appended drawings, wherein:

FIG. 10 shows an apparatus according to an example embodiment of the present disclosure;

FIG. 11 shows a method according to an example embodiment of the present disclosure;

FIG. 12 shows an apparatus according to an example embodiment of the present disclosure;

FIG. 13 shows a method according to an example embodiment of the present disclosure; and FIG. 14 shows an apparatus according to an example embodiment of the present disclosure;

DETAILED DESCRIPTION OF CERTAIN EMBODIMENTS

Figure 1A:
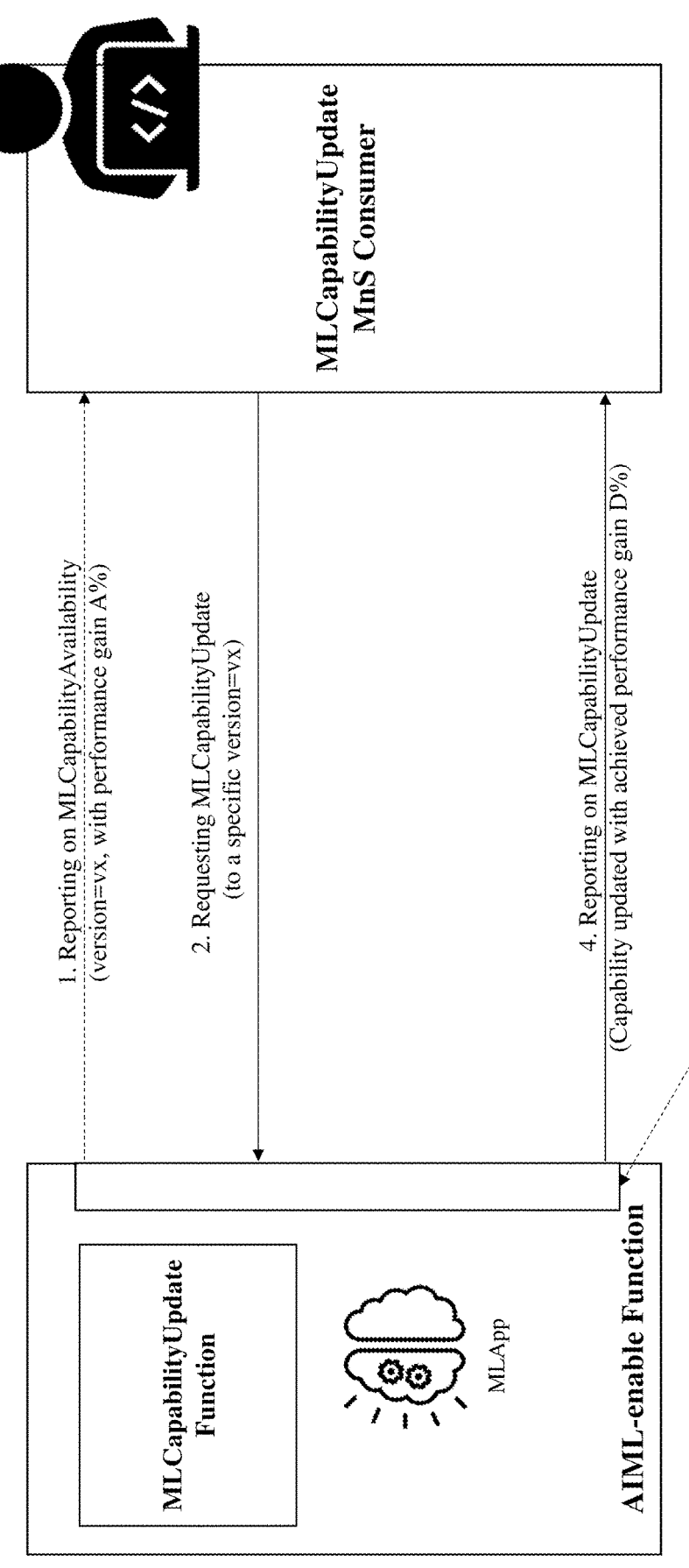
FIG. 1a illustrates management and control of the ML capability update process according to some example embodiments of the present disclosure.

Herein below, certain embodiments of the present disclosure are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the present disclosure to the disclosed details.

Moreover, it is to be understood that the apparatus is configured to perform the corresponding method, although in some cases only the apparatus or only the method are described.

In many cases, network conditions change making the machine learning-based functions degenerate or at least inappropriate for the changed network conditions. At the same time, depending on their configurations, AI/ML-enabled functions may learn new characteristics, even during their utilization, e.g., if they are configured to learn through reinforcement learning or if they are configured to download new versions of their AI/ML Entities. This knowledge may be available to use but is not applied until explicitly triggered. In such cases, the consumer of AI/ML services exposed by the AI/ML-enabled function (e.g., the operator, a management function, or a consumer network function) may wish to trigger the AI/ML Capability of the AI/ML-enabled function to be updated.

In particular, the consumer of AI/ML services exposed by the AI/ML-enabled function ("consumer") may wish to define the update-trigger conditions under which the AI/ML Capability may be updated. The update-trigger conditions refer to network-related, use case-related or operations-related constraints and metrics which must be fulfilled before the update is triggered. For example, the consumer may wish to express that the update to the AI/ML Capability should be executed only if the update AI/ML Capability guarantees a performance gain of some threshold above the performance achievable with the prevailing AI/ML Capability. In another example, the consumer may wish to trigger the update to the AI/ML Capability after a certain number of decisions, as the set of observation and their corresponding decisions may provide a new set of data that can be used to retrain the related AI/ML Entity or AI/ML Entities.

Some example embodiments of the present disclosure enable a consumer to trigger a network function (e.g., an AI/ML-enabled function) to update its AI/ML Capability and to manage the subsequent process even when the consumer does not know the respective AI/ML Entity or AI/ML Entities of network function are to be updated or the required processes to achieve such an update.

Typically, a network function that employs AI/ML (i.e., an AI/ML-enabled function) does not expose the artificial intelligence/machine learning (AI/ML) Entities it employs, so the consumer of AI/ML services exposed by the network function (i.e., an AI/ML-enabled function) may not know which particular AI/ML Entities have degenerated. Instead the consumer may simply realize that the insight or decisions generated by the network function are no longer appropriate for the observed network states. In some cases, retraining of an AI/ML Entity may be the required action. It is typically the case however that the network function (i.e., the AI/ML-enabled function) only has inference capability and is not equipped to retrain its constituent AI/ML Entities. Yet the consumer of AI/ML services still need to request for improvements in the AI/ML Capability of the AI/ML-enabled function.

As such, the consumer may wish to trigger the AI/ML Capability of a network function (i.e., an AI/ML-enabled function) to be updated without knowing which particular AI/ML Entity needs to be updated. In particular, the consumer may wish to express that the update should be executed only if it guarantees a performance gain of some threshold above the performance achievable with the prevailing AI/ML Capability. The consumer may request the network function that has AI/ML Capability to update its AI/ML Capability, in the specific case of performance constrained update specifying the performance improvement that should justify the update.

The network function (i.e., the AI/ML-enabled function) responds accordingly, providing information via reports to the consumer about the progress and outcomes of the update. Subsequently, the consumer needs to be able to manage the process even without knowing the details about the AI/ML Entity or AL/ML Entities being updated.

Some example embodiments of the present disclosure enable such consumer-triggered update of the AI/ML Capability of a network function (i.e., an AI/ML-enabled function) and the related management. Other example trigger conditions for requesting an update of the AI/ML Capability are a time having passed after the previous request for an update and a number of available update versions.

Some example embodiments of the present disclosure provide means to enable an entity (the consumer of AI/ML capability update MnS) to trigger and manage an update of AI/ML Capability of a given AI/ML-enabled function. The AI/ML-enabled function thus implements an appropriate AI/ML capability update function that has or implements an interface module as the producer of AI/ML capability update management services (MLCapabilitiesUpdate MnS Producer). The AI/ML capability update function ( ) and the producer of AI/ML capability update management services (update service producer) may be jointly referred to as the MLCapabilityUpdate. The AI/ML capability update function may involve multiple processes directed towards one or more AI/ML Entities of the AI/ML-enabled function.

An authorized consumer (update service consumer) may request the MLCapabilityUpdate to update the AI/ML Capability (i.e. the AI/ML capability influencing a network service; the network service may be provided by the update service consumer or by a different function; for example, if the network service is provided by the different function, the different function or an operator or still another function may invoke the update service consumer to request the update service producer to update the AI/ML capability). Accordingly, the MLCapabilityUpdate receives a request to update the AI/ML Capability, hereinafter referred to as MLCapabilityUpdateRequest, and subsequently instantiates a capability update process (hereinafter referred to as the MLCapabilityUpdateJob) associated with the received MLCapabilityUpdateRequest and the specified AI/ML Entity.

The authorized consumer may request the MLCapabilityUpdate to update the AI/ML Capability of an AI/ML-enabled function if a specific update-trigger condition (e.g., on performance, time after previous update request, number of available update versions etc.) is met. Otherwise, the consumer may not request the update. Thus, in some example embodiments, the MLCapabilityUpdate receives an MLCapabilityUpdateRequest that specifies the minimum performance gain that should be achieved with the said AI/ML capability update. The MLCapabilityUpdate subsequently instantiates a MLCapabilityUpdateJob associated with the received MLCapabilityUpdateRequest and the specified AI/ML Entity.

The update service producer of the MLCapabilityUpdate may inform any authorized consumer (update service consumer) of the availability of new AI/ML Capability (e.g. as learned through a training process or as provided via a software update) and the readiness to update the AI/ML Capability of the respective network function (i.e., AI/ML-enabled function) when triggered. The update service producer may include information related to the newly available AL/ML Capability and the information may include the version number of the newly available AI/ML Capability. Relatedly, there may be more than one newly available AI/ML Capability, so the information may include a version number of each newly available AI/ML Capability. The MLCapabilityUpdateRequest may include a specific version of a newly available AI/ML Capability which may be applied in the update.

The update service producer of the MLCapabilityUpdate may inform any authorized consumer of the expected performance gain if/when the AI/ML Capability of the respective network function (i.e., AI/ML-enabled function) are updated with/to the specific newly available AI/ML Capability. Thus, the update service consumer may decide on the version for the update based on the expected performance gain. In particular, it may select a version that maximizes the performance gain. However, if other boundary conditions are to be taken into account, the update service consumer may select another version which still has an optimized expected performance gain under the other boundary conditions. If the update service consumer selects a version, the MLCapabilityUpdateRequest includes the selected version of the AI/ML Capability which may be applied in the update.

If the AI/ML-enabled function updates its AI/ML Capability for a specific AI/ML Entity:

The AI/ML-enabled function may instantiate a capability update process (the MLCapabilityUpdateJob) as the managed object instance for managing the end-to-end update process.

The update may be accomplished in any one of multiple ways, so the end-to-end update process may undertake the according actions for the respective method of accomplishing the update, specifically:

It may require downloading a new software (instructions) that is receives with the required updates It may require downloading a file from a remote server, the file containing parameters (e.g., configuration parameters) for the one or more AI/ML Entities It may require triggering one or more remote or local AI/ML-related processes needed to generate the update parameters.

Multiple remote or local AI/ML-related processes may be triggered as part of the update, in particular:

the AI/ML Entity may be retrained so the AI/ML-related process may need to trigger a ML training process which must be completed. The thus derived parameters may be downloaded and employed. Only then, the update may be considered to be complete.

the retrained AI/ML Entity may require to be tested so the process may trigger a ML testing process which must be successfully completed with positive results for the update to be considered complete.

An authorized consumer may request reporting, and the MLCapabilityUpdate may report, for a specific MLCapabilityUpdateRequest, on a specific MLCapabilityUpdateJob or on the outcomes of any such MLCapabilityUpdateRequest or MLCapabilityUpdateJob. An authorized consumer (e.g. the function/entity that generated the MLCapabilityUpdateRequest or a supervisor thereof) may define the reporting characteristics related to a specific MLCapabilityUpdateJob.

An authorized consumer (e.g., an operator or the function/entity that generated the MLCapabilityUpdateRequest) may manage the request, e.g., to suspend, re-activate or cancel the MLCapabilityUpdateRequest; or to adjust a desired characteristics of the desired capability update. An authorized consumer (e.g., an operator) may manage or control a specific MLCapabilityUpdateJob, e.g. to start, suspend or restart the capability update; or to adjust the capability update update-trigger conditions or characteristics, e.g., the times when the update may be executed.

The update service producer of the MLCapabilityUpdate may inform any authorized consumer of the outcomes of the request (and subsequent process(es)) to update AI/ML Capability. The update service producer of the MLCapabilityUpdate may inform any authorized consumer of the achieved performance gain following the update of the AI/ML Capability of a network function (i.e., the AI/ML-enabled function) with/to the specific newly available AI/ML Capability.

Figure 1B:
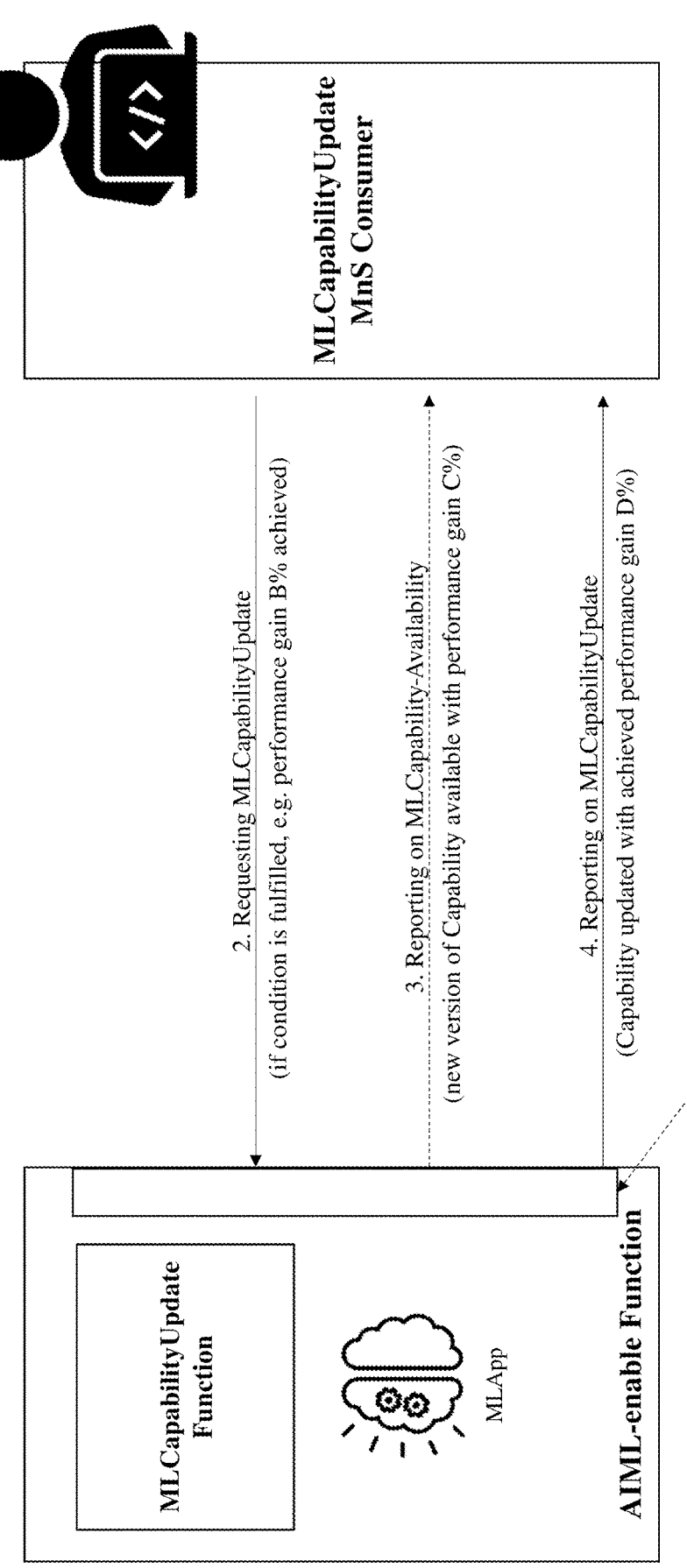
FIG. 1b illustrates management and control of the ML capability update process according to some example embodiments of the present disclosure.

Message sequence according to some example embodiments of the present disclosure are illustrated by FIGS. 1a and 1b. In the example embodiment of FIG. 1a, the update service consumer decides whether the condition to update is fulfilled. In the example embodiment of FIG. 1b, the update service producer decides whether the condition to update is fulfilled. In FIGS. 1a and 1b, corresponding actions are labelled with the same numbers. Therefore, FIG. 1a does not show action 3 (shown in FIG. 1b), and FIG. 1b does not show action 1 (shown in FIG. 1a).

The actions shown in FIG. 1a are as follows:

One or more new versions of the AI/ML Capability are available to the update service producer or its MLCapabilityUpdate function. E.g., the update service producer or its MLCapabilityUpdate function may obtain a new version of the AI/ML Capability by undertaking or requesting a training process which may be triggered by some internal conditions. For example, such internal conditions may be made available by the vendor of the AI/ML-enabled function. This action is internal to the update service producer or its MLCapabilityUpdate function (not shown in FIG. 1a).

Action 1—When one or more new versions of the AI/ML Capability are available, the update service producer informs the update service consumer of the available versions of the AI/ML Capability and a property thereof, such as an expected performance gain by updating to that version. If there are more than one new version of the AI/ML Capability, a respective property is indicated for each of the new versions of the AI/ML Capability.

Based on the indicated one or more properties, the update service consumer determines if any of the available versions meets its requirements. E.g., the update service consumer may decide if the expected performance gain is sufficient. The update service consumer may thus select a new version that meets its requirements. This action is internal to the update service consumer (not shown in FIG. 1a).

Action 2—The update service consumer requests the update service producer to update the AI/ML Capability to the new version. If the update service provider indicated multiple new versions of the AI/ML Capability and the update service consumer selected a specific version of the AI/ML Capability, the update service consumer indicates the selected version of the AI/ML Capability which should be updated to.

The update service producer or its MLCapabilityUpdate function activates the (selected) new version. It may also execute or request for testing of the new version of the AI/ML Capability to be sure it delivers what was expected. This action is internal to the update service producer or its MLCapabilityUpdate function (and the action is not shown in FIG. 1a).

Action 4—After activating the new version of the AI/ML capability (and undertaking the related testing, if any) the update service producer reports to the update service consumer that the new version been activated. The report may also indicate the actual achievement of the new version, e.g. the performance gain realized after testing the new capabilities. As another option, the achievement may be reported in a later report.

The actions shown in FIG. 1b are as follows:

Action 2—Potentially without knowing if there are any candidate versions of the AI/ML Capability or when they are available and what are their properties, the consumer request the update service producer to update the AI/ML Capability. The update service consumer may indicate the conditions under which the AI/ML Capability may be updated, e.g., the minimum performance gain which is expected due to the updating to the new version.

Based on the condition (e.g., required minimum expected performance gain) that should result from an update provided by action 2, the update service producer or its MLCapabilityUpdate function attempts to collect or identify new one or more versions of the AI/ML Capability, e.g. by undertaking or requesting a training process, or checking existing versions for the condition. This action is internal to the update service producer or its MLCapabilityUpdate function (the action is not shown in FIG. 1b).

Action 3—When at least one new version of the AI/ML Capability that meets the stated condition is available, the update service producer may inform the update service consumer of the new version of the AI/ML Capability and their potential achievements. This action is optional, as indicated by a dashed arrow in FIG. 1b.

Since a new version of the AI/ML Capability meets the stated condition, the update service producer or its MLCapabilityUpdate function activates the new version. In addition, it may also execute or request for testing of the new version of the AI/ML Capability to be sure it delivers what was expected. This action is internal to the update service producer or its MLCapabilityUpdate function (not shown in FIG. 1b).

Action 4—After activating the new version of the AI/ML Capability (and undertaking the related testing, if any) the update service producer may the report to the update service consumer that the new version of the AI/ML Capability has been activated. This report (or a later report) may also indicate the actual achievement of the new version of the AI/ML Capability, e.g., the performance gain realized after testing the new version of the AI/ML Capability.

Some example embodiments are explained where the condition for update comprises a performance gain of a network function (i.e., a AI/ML-enabled function) influenced by the AI/ML capability. However, the condition may comprise other conditions instead of or in addition to a performance gain. Examples of such conditions are that the training period of a certain version must comprise a certain time period, or that the training period of a certain version must exclude a certain time period, or that the training period of a certain version must have a minimum duration.

Some example embodiments of the present disclosure may be used in the following use cases:

1. Availability of New Capabilities

Depending on their configurations, AI/ML-enabled functions may learn new characteristics even during their utilization, e.g., if they are configured to learn through reinforcement learning or if they are configured to download new versions of their AI/ML Entities. This knowledge may be available to use but the AI/ML-enabled function may not be configured to apply this knowledge by default but to only apply it when explicitly triggered. In such cases, the consumer of AI/ML services that are exposed by the AI/ML-enabled function (e.g., the operator, a management function, or a consumer network function) may wish to be informed when such capabilities are available.

2. Requesting AI/ML Capability Update

When the capabilities of AI/ML-enabled functions degenerate, the typical action may be to trigger re-training of the AI/ML-enabled function or its constituent AI/ML Entities. It may be the case, however, that the AI/ML-enabled function only has inference capabilities and is not equipped to retrain its constituent AI/ML Entities. Yet the consumer of AI/ML services may still need to request for improvements in the capabilities of the AI/ML-enabled function. In such cases, the consumer of AI/ML services that are exposed by the AI/ML-enabled function (e.g. the operator, a management function, or a consumer network function) may wish to trigger the capabilities of the AI/ML-enabled function to be updated even without knowing what internal actions the AI/ML-enabled functions shall take.

The consumer may want to request the AI/ML-enabled function to update its constituent capabilities and the AI/ML-enabled function shall respond accordingly. For example, the AI/ML-enabled function may download new software that comes with the required updates, download from a remote server a file containing configurations and parameters for the one or more AI/ML Entities, or it may trigger one or more remote or local AI/ML-related processes (including training, testing, etc.) needed to generate the required updates.

3. Control of AI/ML Capability Update

Given the capability for an AI/ML-enabled function to receive and execute updates for AI/ML Capability, a consumer may wish to manage that capability and its related process(es) even without knowing the details about the AI/ML Entities being updated. For example, the operator may wish to define policies on how often the AI/ML Capability may be updated. Alternatively, for a specific a request to update AI/ML Capability and the respective AI/ML Capability update process, the operator may wish to suspend or restart the AI/ML capability update process or to adjust the update-trigger conditions or characteristics, e.g., the times when the update may be executed. Correspondingly, the 3GPP management system needs to provide the AI/ML capability to allow the AI/ML capability update process to be configured and managed.

Hereinafter, an example embodiment of the present disclosure is described at greater detail:

******* BEGIN: Example Embodiment ********

Figure 2:
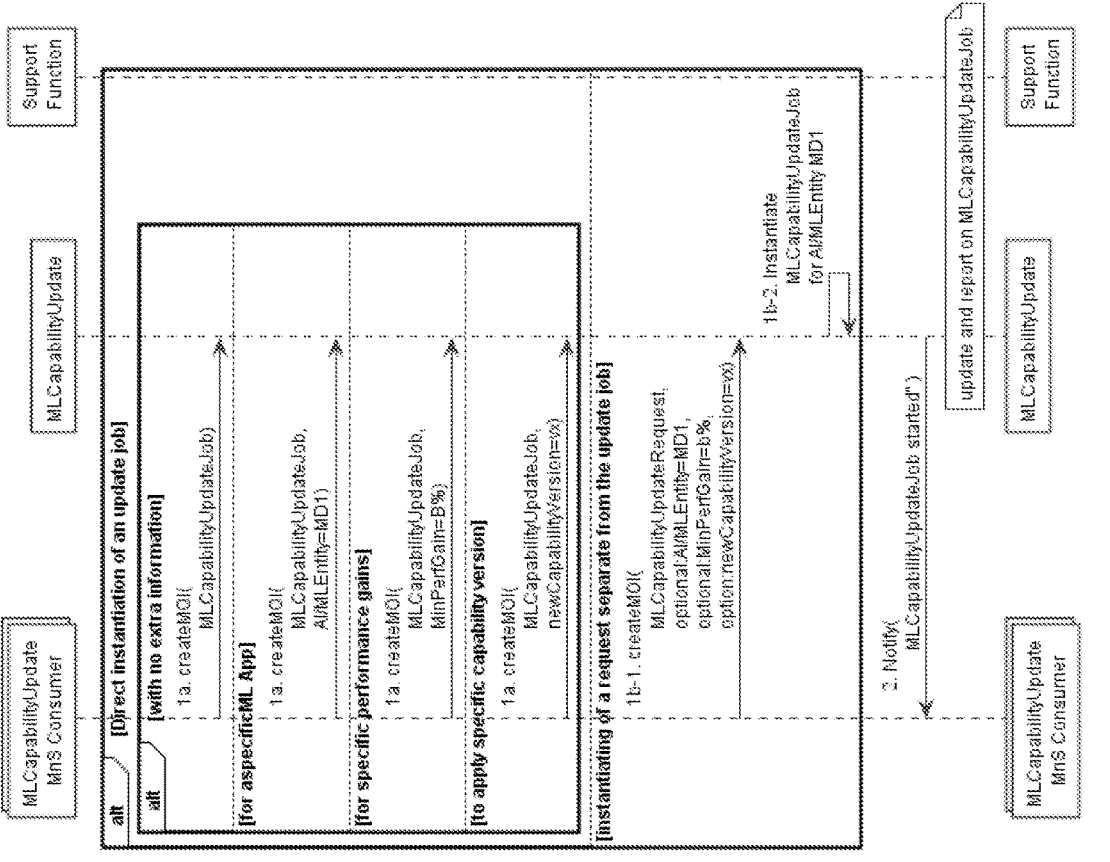
FIG. 2 illustrates requesting and instantiating MLCapabilityUpdate process according to some example embodiments of the present disclosure.

The following describes the MLCapabilityUpdate Management Procedures 1.1. Requesting and instantiating Update of AI/NIL Capability The MLCapabilityUpdate has the capability to instantiate a MLCapabilityUpdateJob based on requests from consumers as illustrated by FIG. 2.

Requests for updating ML Capability of network functions may be received using MLCapabilityUpdate Provisioning Management service implemented via CRUD (Create, Read, Update, Delete) operations on the MLCapabilityUpdateRequest objects.

Any request for Updating ML Capability of network functions may indicate the AI/ML Entity, i.e., the identifier of the specific AI/ML Entity that the consumer wishes to be updated. The request may alternatively indicate the identifier of the AI/ML-enabled function that contains the AI/ML Entity which the consumer wishes to be updated.

The consumer may wish to have the AI/ML Capability updated for new expectedRuntimeContext. Correspondingly, the request for Updating AI/ML Capability may indicate a specific expectedRuntimeContext as the operating conditions and environment in which the AI/ML Entity is expected to be deployed and for which the consumer wishes the MLCapabilityUpdate to match.

The request for Updating ML Capability may indicate a performanceGainThreshold as the minimum performance gain of the network service influenced by the AI/ML that should be achieved with the said capability update.

Following a request, the MLCapabilityUpdate creates an instance of MLCapabilityUpdateRequest and may update that instance with status related to that request, e.g. that an associated MLCapabilityUpdateJob has been instantiated.

MLCapabilityUpdate may also notify the consumer who initiated the request of the corresponding action taken regarding the request.

A MLCapabilityUpdateJob should be instantiated for each MLCapabilityUpdateRequest. For this reason, the solution may also be designed such that a consumer directly instantiates an MLCapabilityUpdateJob instead of instantiating a MLCapabilityUpdateRequest from which a MLCapabilityUpdateJob is later instantiated.

1.2. Updating AI/ML Capabilities

For a given a MLCapabilityUpdateRequest, the MLCapabilityUpdate function instantiates and triggers a MLCapabilityUpdateJob as the process through which the specific AI/ML Entity shall be updated. The update involves one of the processes illustrated in FIG. 3:

The MLCapabilityUpdate may download a new software (from a server or function within or outside the network) that comes with the required updates The MLCapabilityUpdate may download (from a server or function within or outside the network) a file containing parameters (incl. configurations) for the one or more AI/ML Entitys The MLCapabilityUpdate may trigger retraining and testing for one or more, the retraining undertaken locally or on a separate network function After the AI/ML Capability is obtained, the MLCapabilityUpdate may execute the update and subsequently notify the consumer when the update is completed.

1.3. Reporting on AI/ML Capability Update

During or subsequent to instantiating the MLCapabilityUpdate process, the MLCapabilityUpdate consumer may configure reporting for the corresponding MLCapabilityUpdateRequest. Given requirements for reporting on MLCapabilityUpdate e.g., as stated in a MLCapabilityUpdateRequest, the MLCapabilityUpdateJob shall report on the progress and outcomes of the respective ML Capability Update.

Figure 3:
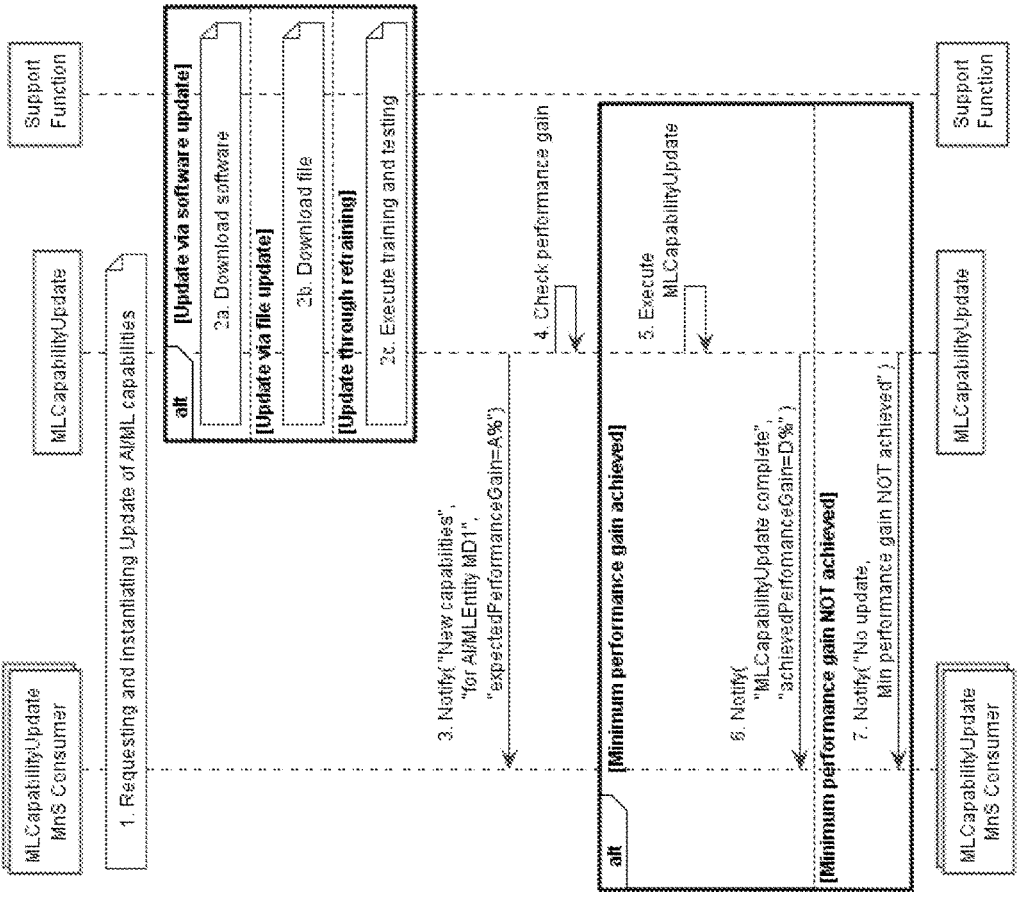
FIG. 3 illustrates executing and reporting on MLCapabilityUpdate according to some example embodiments of the present disclosure.

For example, the request may indicate a requirement to report when new capabilities are available and before those capabilities are activated. The respective reporting may be accomplished via notifications that deliver a report on the update process or its outcomes as illustrated by FIG. 3.

The reporting may indicate the expected achievable performance gain if and when the new capabilities are applied.

Figure 4:
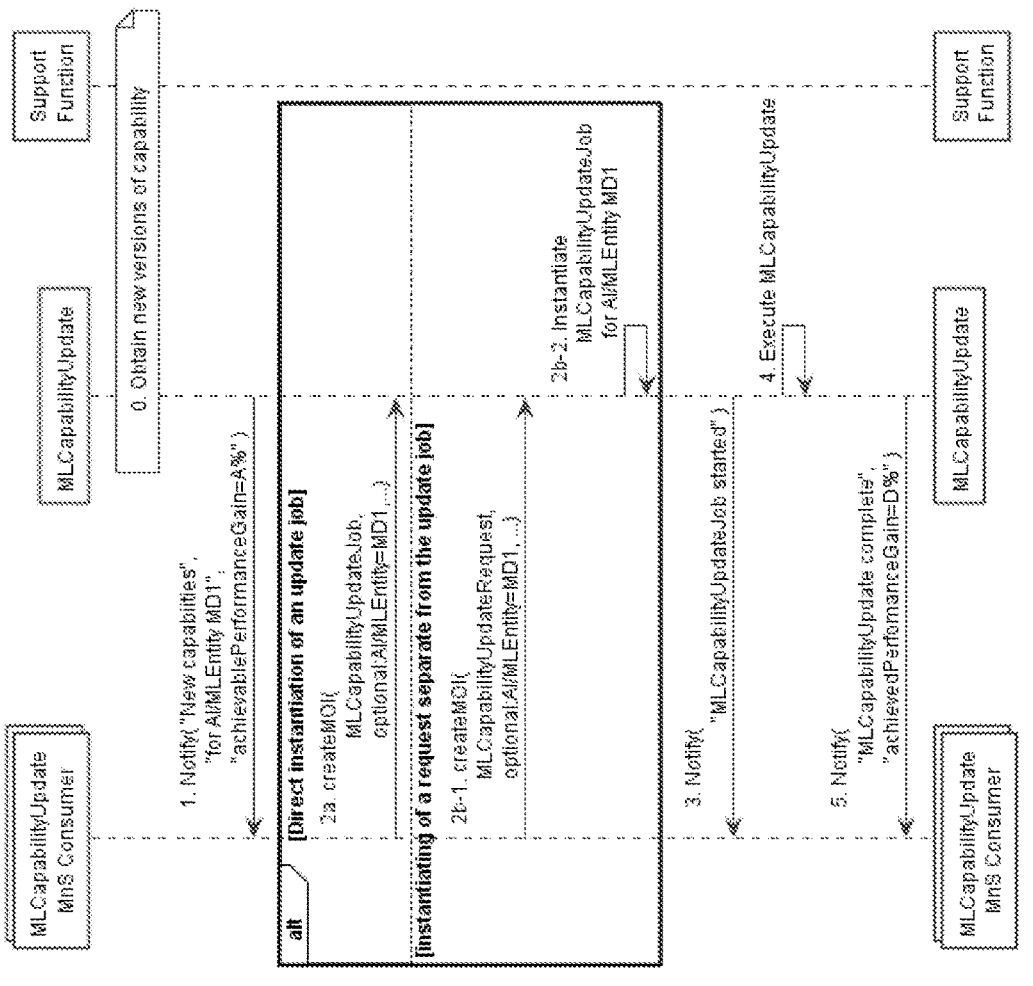
FIG. 4 illustrates requesting and executing MLCapabilityUpdate based on capabilities made previously available according to some example embodiments of the present disclosure.

1.4. Requesting, Executing and Reporting on Updates Based on AI/ML Capabilities Made Previously Available In sections 1.1 and 1.2, the AI/ML capabilities are assumed not to be available and the request for update triggers the MLCapabilityUpdate function to find the appropriate capabilities. It is possible however, that the new capabilities are made available previously, e.g. as learned through a reinforcement learning process. Thereby, the request for update may follow an indication that there are available capabilities, in which case, the sequence of actions changes as shown in FIG. 4.

The indication for availability of new capabilities may include the expected performance gain if the capabilities are applied. In such a case, the subsequent request for capability update may not state the desired performance gain since they will have been stated in the received indication. Subsequently, the application of the new capabilities does not require a check for specific improvement in performance.

Figure 5:
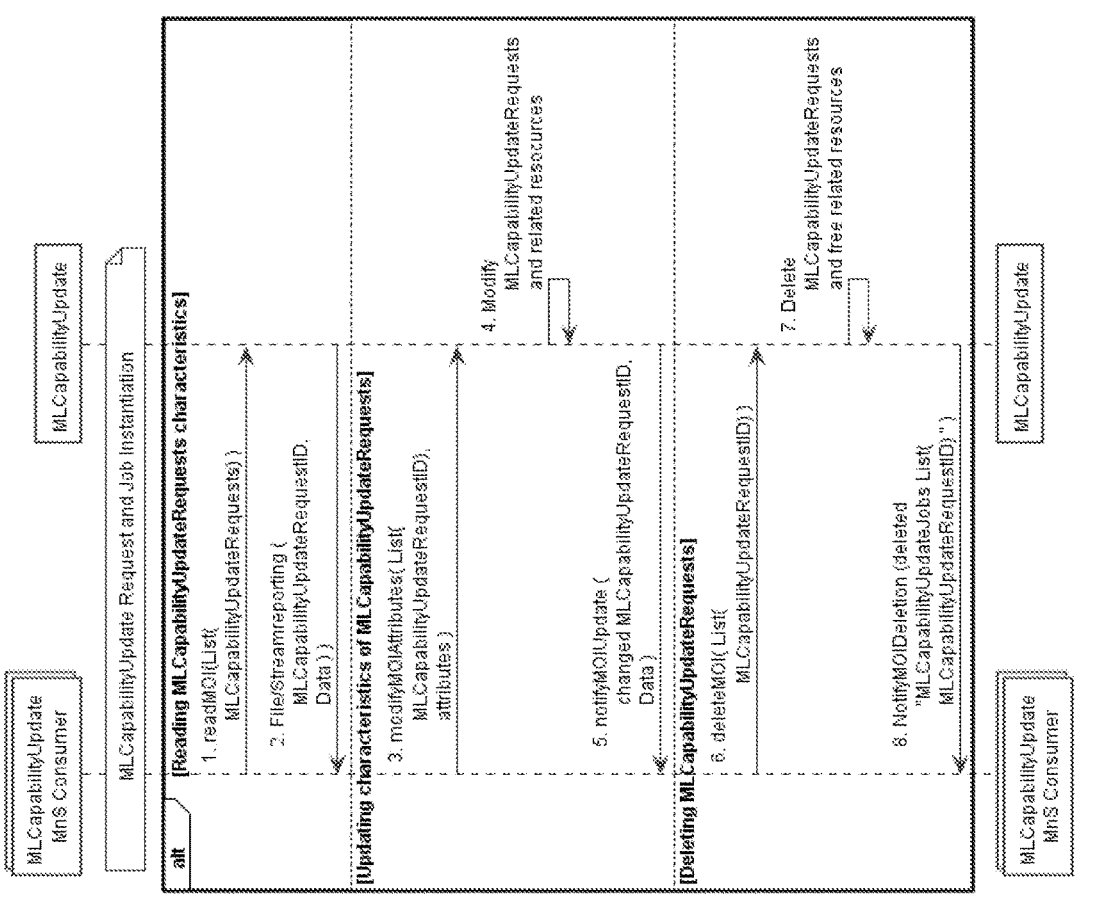
FIG. 5 illustrates managing and controlling ML capability update requests according to some example embodiments of the present disclosure.
Figure 6:
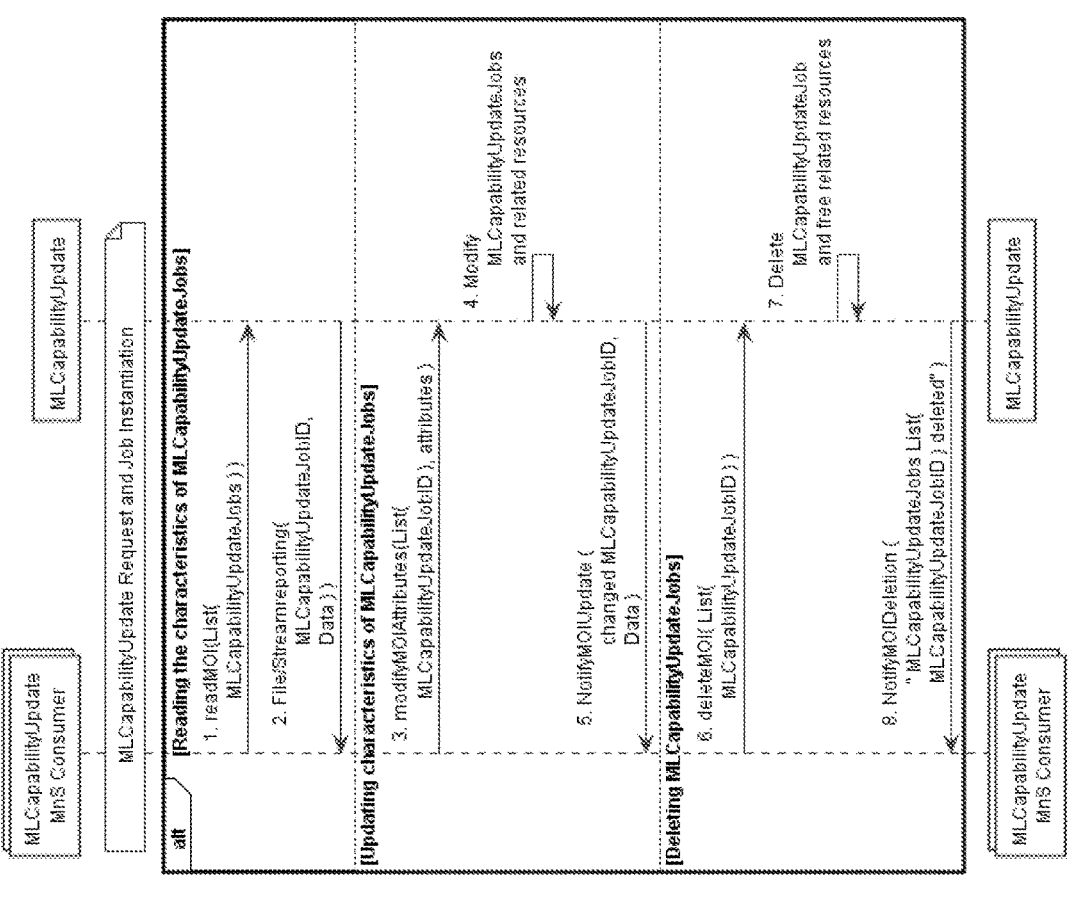
FIG. 6 illustrates managing and controlling ML capability update processes according to some example embodiments of the present disclosure.

1.5 Managing and Controlling MLCapabilityUpdateRequests & MLCapabilityUpdateJobs The MLCapabilityUpdate may have the capability and a control interface to allow a consumer (e.g., the operator) to configure and manage one or more MLCapabilityUpdateRequests. An example of the control interface is illustrated by FIG. 5. The control interface enables the consumer to get the outcomes of the request. This may be achieved using the Notify procedure of the 3GPP provisioning management service:

enable the consumer to read the characteristics of submitted MLCapabilityUpdateRequests. This may be achieved using the readMOI procedure of the 3GPP provisioning management service. For example, the consumer to read the number of submitted, ongoing or completed MLCapabilityUpdateRequests the features (e.g. priorities, expectedRuntimeContext, . . . ) of the different submitted or ongoing MLCapabilityUpdateRequests.

the status or completion levels of the different MLCapabilityUpdateRequests.

enable the consumer to configure the submitted MLCapabilityUpdateRequests, e.g., the operator may change the priorities of one or more MLCapabilityUpdateRequests to indicate those that need to be prioritised regarding the instantiation of the related MLCapabilityUpdateJobs. Relatedly, it may enable a consumer to update the priority of the MLCapabilityUpdateRequest sent earlier by that consumer. The configuration may be achieved using the updateMOI procedure of the 3GPP provisioning management service Following an update request, the MLCapabilityUpdate may notify the consumer about the success of the executed updates on the MLCapabilityUpdateRequests enable the consumer to delete unwanted MLCapabilityUpdateRequests. This may be achieved using the deleteMOI procedure of the 3GPP provisioning management service Following a delete request, the MLCapabilityUpdate may notify the consumer about the success of the executed deletion of MLCapabilityUpdateRequests Note that corresponding operations may be available for the MLCapabilityUpdateJobs, i.e., the MLCapabilityUpdate may have the capability and a control interface to allow a consumer (e.g., the operator) to configure and manage one or more MLCapabilityUpdateJobs, as illustrated in FIG. 6.

2 MLCapabilityUpdate Information Model

This section defines the <<informationObjectClasses>> (<<IOCs>>) and <<dataTypes>> needed to realize ML capability update as well as the relationships among these IOCs and dataTypes.

2.1 Class Diagram 2.1.1 Relationship

Figure 7:
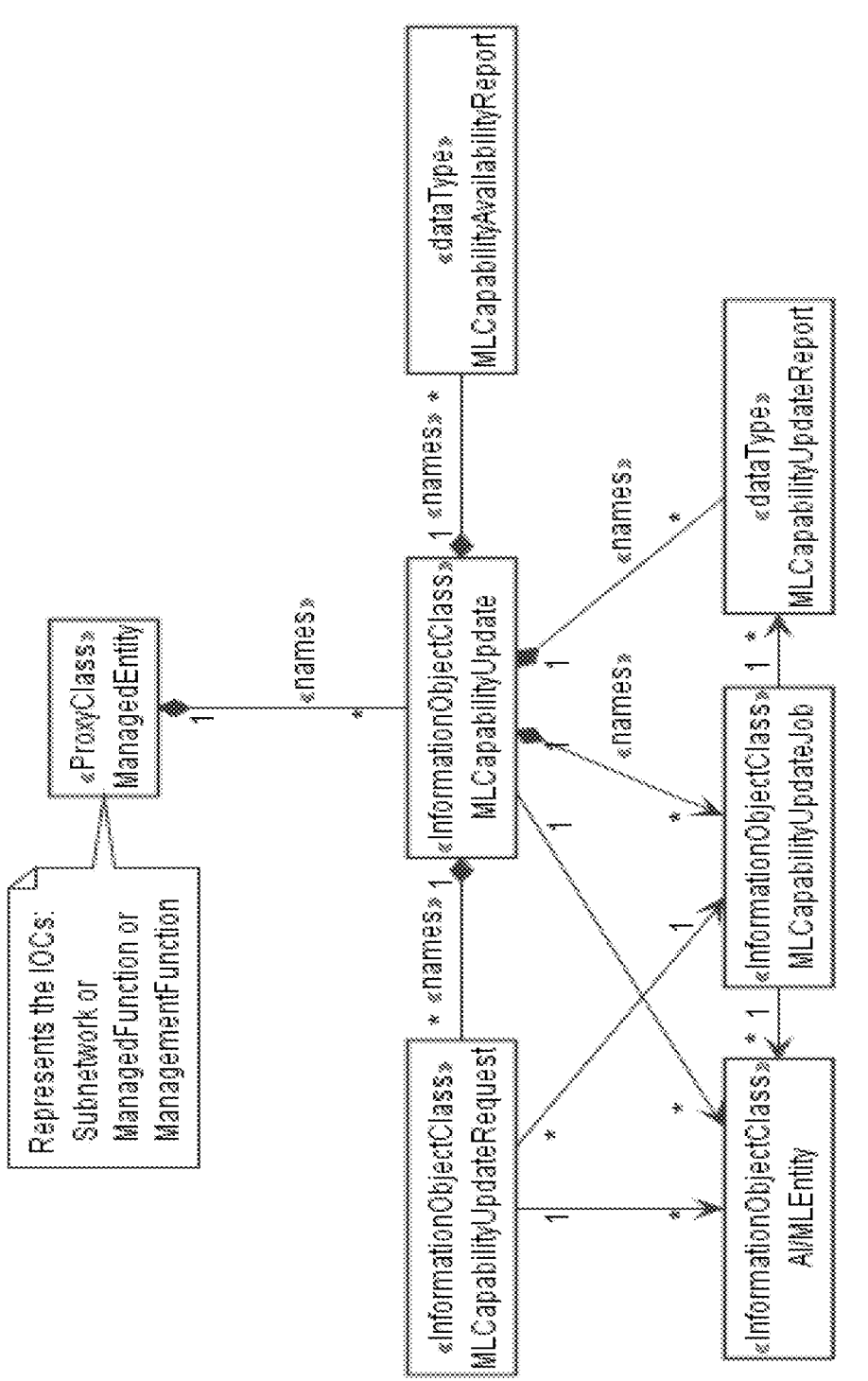
FIG. 7 illustrates an information Model for ML capability update Control according to some example embodiments of the present disclosure.

FIG. 7 illustrates an information Model for ML capability update Control.

Figure 8:
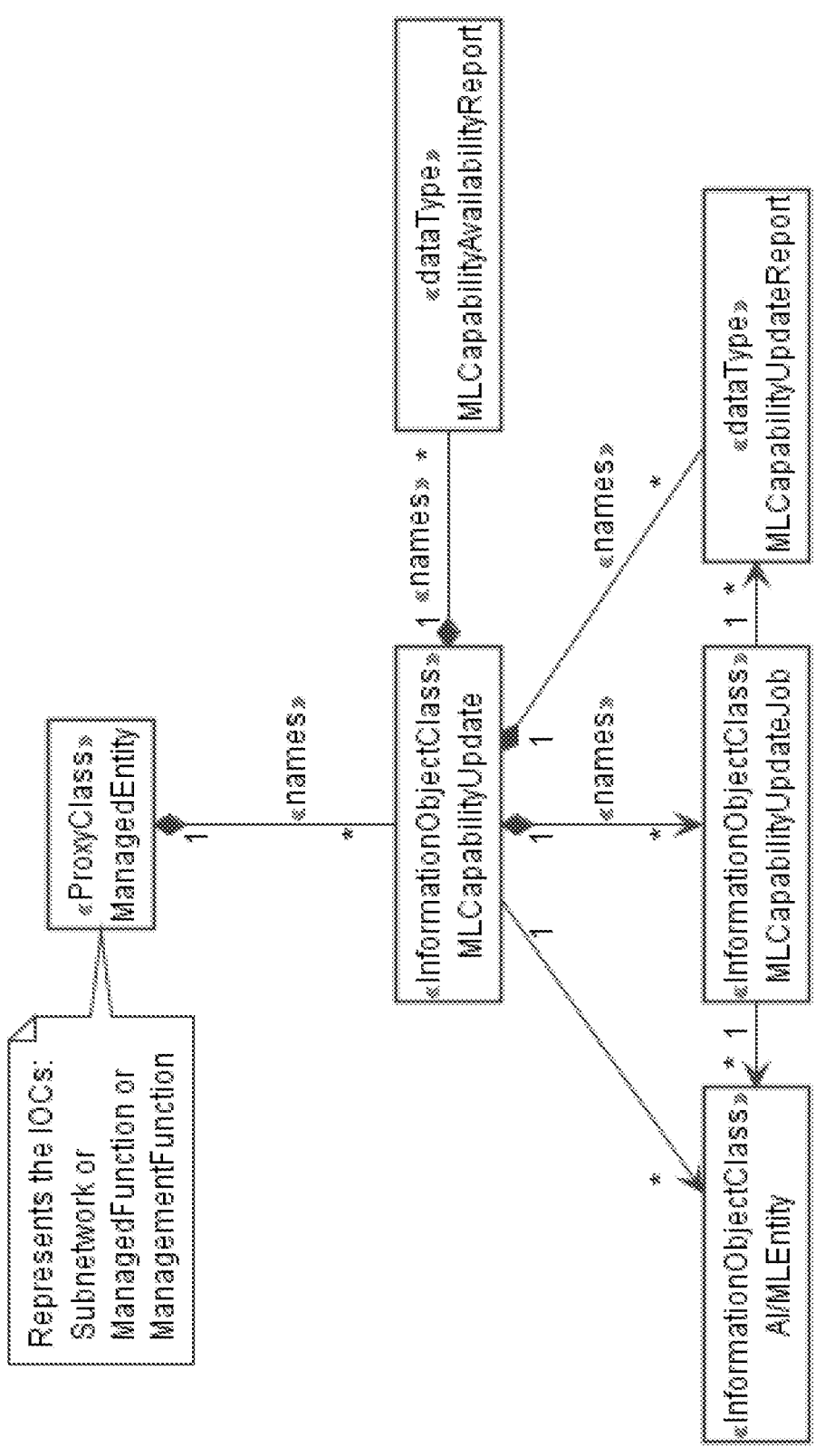
FIG. 8 illustrates Information Model for ML capability update Control according to some example embodiments of the present disclosure.

Note: In case a MLCapabilityUpdateJob is directly instantiated by an authorized consumer, MLCapabilityUpdateRequest is not needed, and no IOC is modelled for it in that case. Accordingly, FIG. 7 may be simplified to FIG. 8.

2.1.2 Inheritance

Figure 9:
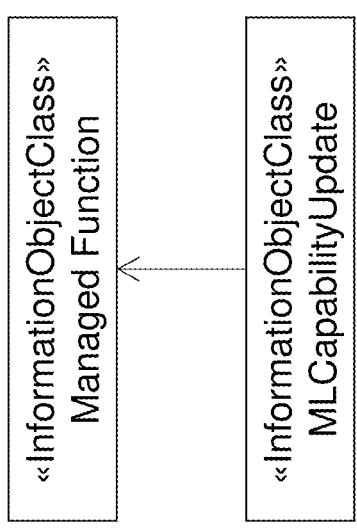
FIG. 9 illustrates ML capability update Inheritance Relations according to some example embodiments of the present disclosure.

FIG. 9 illustrates ML capability update Inheritance Relations 2.2 Class Definition 2.2.1 MLCapabilityUpdate <<IOC>>

2.2.1.1 Definition

This IOC represents the properties of MLCapabilityUpdate.

MLCapabilityUpdate is a managed function instantiable from the MLCapabilityUpdate information object class and name-contained in either a subnetwork, a managedFunction or a managementFunction. The MLCapabilityUpdate is a type of managedFunction, i.e. the MLCapabilityUpdate is a subclass of and inherits the capabilities of a managedFunction 2.2.1.2 Attributes The MLCapabilityUpdate shall be associated with one or more AI/MLEntitys.

E.g., the AI/MLEntitys associated with MLCapabilityUpdate may be associated via a list of AI/MLEntityIdentifers. The AI/MLEntityIdentifers should specify the model and any specific version thereof using a set of fields or characters that allow a tree of different versions of ML-models or AI/MLEntitys to be created in a way that identifies the critical differences among them. The AI/MLEntityIdentifer may indicate the organisation that created the AI/MLEntity, the intended conditions for using the AI/MLEntity or the time when it was created. E.g. NK01_Rural_v2102 may be an identifier for an AI/MLEntity created by Nokia in February 2021 for use in Rural environments. Note that the AI/MLEntityIdentifer may be generated by the operator or it may be autogenerated e.g. based on the model's training date e.g. as defined in PCT/EP2021/ 059631 The MLCapabilityUpdate shall contain one or more MLCapabilityUpdateRequests as well as one or more MLCapabilityUpdateJobs, where an MLCapabilityUpdateJob is instantiated following or in response to one received MLCapabilityUpdateRequest.

The MLCapabilityUpdate IOC includes the attributes shown in Table 1:

TABLE 1

Attributes of MLCapabilityUpdate IOC
(M = Mandatory, CM = Conditional Mandatory, O = optional, T = true, F = false)

| Attribute name | Support Qualifier | isReadable | isWritable | isInvariant | isNotifyable |
|---|---|---|---|---|---|
| AI/MLEntitysList | CM | T | F | F | F |
| Attributes related to Role | | | | | |
| | | | | | |
| MLCapabilityUpdateJobRef | M | T | F | F | F |
| MLCapabilityUpdateRequest | M | T | T | F | T |
| MLCapabilityAvailabilityReport | M | T | T | F | T |
| MLCapabilityUpdateReport | M | T | T | F | T |

2.2.2 MLCapabilityUpdateJob <<IOC>>

2.2.2.1 Definition

This IOC represents the properties of MLCapabilityUpdateJob.

For each MLCapabilityUpdateRequest to update the ML Capability, the MLCapabilityUpdateJob is instantiated for the MLCapabilityUpdateRequest or the MLCapabilityUpdateRequest is associated with an ongoing MLCapabilityUpdateJob if the MLCapabilityUpdateJob is updating the same AI/MLEntitys as stated in the MLCapabilityUpdateRequest. In other words, the MLCapabilityUpdateJob is associated with at least one MLCapabilityUpdateRequest. Relatedly, the MLCapabilityUpdateJob is associated with at least one AI/ML Entity.

The MLCapabilityUpdateJob has the capability of compiling and delivering reports and notifications about MLCapabilityUpdate or its associated MLCapabilityUpdateRequests, or the MLCapabilityUpdateJob itself The MLCapabilityUpdateJob shall be associated with one or more MLCapabilityUpdateReports, Each MLCapabilityUpdateJob may have attributes specifying the ML capability update reporting characteristics (e.g. periodically, after completion, etc.).

2.2.2.2 Attributes

The MLCapabilityUpdateJob IOC includes the attributes shown in Table 2.

TABLE 2

Attributes of MLCapabilityUpdateJob IOC
(M = Mandatory, CM = Conditional Mandatory, O = optional, T = true, F = false)

| Attribute name | Support Qualifier | isReadable | isWritable | isInvariant | isNotifyable |
|---|---|---|---|---|---|
| MLCapabilityUpdateJobID | M | T | F | F | F |
| AI/MLEntityID | O | T | F | F | F |
| MLCapabilityUpdateRequests | M | T | T | F | T |
| performanceGainThreshold | O | T | F | T | F |
| newCapabilityVersion | O | T | F | T | F |
| Source | M | T | T | F | T |
| ProgressStatus | M | T | T | F | T |
| MLCapabilityUpdateReports | O | T | F | F | F |

MLCapabilityUpdateJob can be instantiated directly by an authorized consumer. Alternatively, MLCapabilityUpdateJob can be instantiated by MLCapabilityUpdate in response to a MLCapabilityUpdateRequest.

The MLCapabilityUpdateJob may be managed separately from MLCapabilityUpdateRequest, e.g. the MLCapabilityUpdateJob may be instantiated directly without the existence of a related MLCapabilityUpdateRequest.

Each MLCapabilityUpdateJob needs to be managed differently from the related AI/MLEntity, although the MLCapabilityUpdateJob may be associated to at least one AI/MLEntity.

Each MLCapabilityUpdateJob may have a status attribute used to indicate the level of success of the MLCapabilityUpdateJob.

The MLCapabilityUpdateJob may have a source to identify the entity which instantiated it and which may be used to prioritize among different MLCapabilityUpdateJobs from different sources. The sources may for example be an enumeration defined for network functions, operator roles, or other functional differentiations.

2.2.3 MLCapabilityUpdateRequest <<IOC>>

2.2.3.1 Definition

This IOC represents the properties of MLCapabilityUpdateRequest.

For each request to update the AI/ML Capability, a update service consumer (e.g., the MLCapabilityUpdate MnS Consumer shown in FIG. 2-6) creates a new MLCapabilityUpdateRequest on the MLCapabilityUpdate, i.e., MLCapabilityUpdateRequest shall be an information object class that is instantiated for each request for updating AI/ML Capability Each MLCapabilityUpdateRequest is associated to at least one AI/ML Entity The MLCapabilityUpdateRequest may be associated with a MLCapabilityUpdateJob that is instantiated in response to the MLCapabilityUpdateRequest. This is written by the MLCapabilityUpdate after the MLCapabilityUpdateJob is instantiated.

The MLCapabilityUpdateRequest may have a source to identify where its coming from and which may be used to prioritize among different MLCapabilityUpdateRequests from different sources. The sources may for example be an enumeration defined for network functions, operator roles, or other functional differentiations.

Each MLCapabilityUpdateRequest may have a RequestStatus field that is used to track the status of the specific MLCapabilityUpdateRequest or the associated MLCapabilityUpdateJob.

of performanceGainThreshold=0% implies that the capabilities should be applied even if there is no noticeable performance gain, it also implies that there should not be a performance degradation.

2.2.3.2 Attributes

The MLCapabilityUpdateRequest IOC includes the attributes shown in Table 3:

TABLE 3

Attributes of MLCapabilityUpdateRequest IOC
(M = Mandatory, CM = Conditional Mandatory, O = optional, T = true, F = false)

| Attribute name | Support Qualifier | isReadable | isWritable | isInvariant | isNotifyable |
|---|---|---|---|---|---|
| MLCapabilityUpdateRequestID | M | T | F | F | F |
| AI/MLEntity | O | T | F | F | F |
| performanceGainThreshold | O | T | F | T | F |
| newCapabilityVersion | O | T | F | T | F |
| MLCapabilityUpdateJob | M | T | F | F | F |
| Source | M | T | T | F | T |
| RequestStatus | M | T | T | F | T |

The RequestStatus is written by the MLCapabilityUpdate when there is a change in status of the update progress. The RequestStatus is an enumeration with the following values:

"Pending": Indicates that the MLCapabilityUpdateRequest has been received but no action has been taken thereof. When other actions are taken regarding the MLCapabilityUpdateRequest, the RequestStatus changes to one of the following values.

"Triggered": when a corresponding MLCapabilityUpdateJob has been instantiated and is running "Suspended": the status when for one reason or another the MLCapabilityUpdateRequest has been suspended by the MLCapabilityUpdate or another authorized consumer, e.g. the operator.

"Served": the status when an MLCapabilityUpdateJob associated to the specific MLCapabilityUpdateRequest has run to completion.

Each MLCapabilityUpdateRequest may contain specific reporting requirements including an MLCapabilityUpdateReportingPeriod that define how the MLCapabilityUpdate may report about the MLCapabilityUpdateRequest or the associated MLCapabilityUpdateJob. The reporting requirements contained in the MLCapabilityUpdateRequest must be mapped to an existing MLCapabilityUpdateJob instance The request for update may be constrained by specific requirements that must be fulfilled for the update to proceed, i.e., the consumer may request that the update only happens if certain characteristics/update-trigger conditions are fulfilled.

In particular, the MLCapabilityUpdateRequest may specify a performanceGainThreshold which defines the minimum performance gain that shall be achieved with the capability update. This implies that the difference in the performances between the existing capabilities and the new capabilities should be at least performanceGainThreshold otherwise the new capabilities should not be applied. A threshold 2.2.4 AI/MLEntity <<dataType>>

2.2.4.1 Definition

This dataType represents the properties of an AI/MLEntity.

For each AI/MLEntity or AI/MLEntity(function) under update, a MLCapabilityUpdateJob is instantiated. The MLCapabilityUpdate may instantiate an MLCapabilityUpdateJob for each MLCapabilityUpdateRequest. Alternatively, authorized consumers may directly instantiate MLCapabilityUpdateJobs to test specific AI/MLEntity or AI/MLEntity(function). The AI/MLEntity includes the attributes inherited from TOP IOC (defined in 3GPP TS 28.622) as well as those as defined for the MLModel in PCT/EP2021/059631.

MLModel

The IOC MLModel represents the different models, derived for specific contexts that might be part of a Network Automation Function (NAF).

These models must reflect the specific contexts of the different phases:

1. To manage the NAF as part of a network (runtime context)

2. The relationship of the NAF as a management system with respect to other network functions (runtime context)

3. To document the (network) context during training (training context) of the NAF and to document the required network context that is expected by the NAF for correct inference (expected runtime context).

Since each model might be related to a set of contexts, these MLModels contain lists of one or more contexts.

Each context is associated to ManagedEntities (NetworkSlice, NetworkSliceSubnets, NetworkFunctions) to model the configuration of the network and to characterize the data provided by the Managed Entities. Further, the contexts refer to DataProviders that are not part of the 3GPP system and are thus not modelled as 3GPP ManagedEntities The full set of attributes for the MLModel is stated by Table 4.

TABLE 4

Attributes for the MLModel IOC
(M = Mandatory, CM = Conditional Mandatory, O = optional, T = true, F = false)

| Attribute name | Support Qualifier | isReadable | isWritable | isInvariant | isNotifyable |
|---|---|---|---|---|---|
| trainingContextList | M | T | F | F | F |
| expectedRuntimeContextList | M | T | F | F | F |
| rutimeContextList | M | T | T | F | T |
| modelProperties | M | T | T | F | T |
| referencePerformance | M | T | F | F | T |
| modelVersion | | | | | |
| operatingConditions | | | | | |

Note:
Model Properties might be a DataType or a class by its own.

Contexts

There are three contexts that are required—the Runtime-Context, TrainingContext, and ExpectedRuntimeContext, each of which is a Data Type of otsown.

These data types document the context of the NAF during the different phases. Parameter values in TrainingContext and ExpectedRuntimeContext are for documentation purpose and thus read-only.

StartTime and endTime document the time interval of a TrainingContext or ExpectedRuntimeContext to characterize the amount of data that has been used for training or the amount of data that is expected during runtime, respectively.

For each datatype the attributes in Table 5 are applicable.

TABLE 5 attributes for the RuntimeContext, TrainingContext, and ExpectedRuntimeContext
(M = Mandatory, CM = Conditional Mandatory, O = optional, T = true, F = false)

| Attribute name | Support Qualifier | isReadable | isWritable | isInvariant | isNotifyable |
|---|---|---|---|---|---|
| ManagedEntityRef | M | T | F | F | F |
| DataProviderRef | M | T | F | F | F |
| startTime | CM | T | T | F | T |
| endTime | CM | T | T | F | T |
| trainingConditions | CM | T | F/T | F/T | F/T |
| trainingState | CM | T | F/T | F/T | F/T |
| operatingConditions | CM | | | | |
| dataCharacteristics | CM | | | | |

2.3 DataType Definitions

2.3.1 MLCapabilityAvailabilityReport <<dataType>>

2.3.1.1 Definition

This dataType represents the properties of MLCapabilityAvailabilityReport.

The MLCapabilityUpdate may generate one or more MLCapabilityAvailabilityReport, which indicate to the consumer that a new AI/ML Capability is available and can be applied.

Each MLCapabilityAvailabilityReport is associated to one or more AI/ML Entities and may indicate the one or more AI/ML Entities to which it applies.

The MLCapabilityAvailabilityReport may include CapabilityVersions which indicate that there are multiple available AI/ML Capability with a different version numbers for each available AI/ML Capability.

The MLCapabilityAvailabilityReport may include the expectedPerformanceGains, which provides information on the expected performance gain if/when the AI/ML Capability of the respective network function (i.e., AI/ML-enabled function) are updated with/to the specific set of newly available AI/ML Capability.

associated to one or more AI/ML Entities and may indicate the one or more AI/ML Entities to which it applies.

2.3.1.2 Attributes

The MLCapabilityAvailabilityReport includes the attributes shown in Table 6.

TABLE 6

Attributes of MLCapabilityAvailabilityReport
(M = Mandatory, CM = Conditional Mandatory, O = optional, T = true, F = false)

| Attribute name | Support Qualifier | isReadable | isWritable | isInvariant | isNotifyable |
|---|---|---|---|---|---|
| MLCapabilityUpdateReportID | M | T | F | F | F |
| MLCapabilityUpdateJobID | M | T | F | F | F |
| AI/MLEntitysList | M | T | F | F | F |

TABLE 6-continued

Attributes of MLCapabilityAvailabilityReport
(M = Mandatory, CM = Conditional Mandatory, O = optional, T = true, F = false)

| Attribute name | Support Qualifier | isReadable | isWritable | isInvariant | isNotifyable |
|---|---|---|---|---|---|
| MLCapabilityUpdateRequests | O | T | F | F | F |
| CapabilityVersions | O | T | F | T | F |
| expectedPerformanceGains | O | T | F | F | F |

2.3.1 MLCapabilityUpdateReport <<dataType>>

2.3.1.1 Definition

This dataType represents the properties of MLCapabilityUpdateReport.

The MLCapabilityUpdate may generate one or more MLCapabilityUpdateReports,

Each MLCapabilityUpdateReport is associated to one or more AI/MLEntitys and may indicate the one or more AI/MLEntitys to which it applies.

The MLCapabilityUpdateReport may indicate the achieved performance gain for the specific ML capability update, which is the gain in performance of the new capabilities compare with the original capabilities.

MLCapabilityUpdate provides reports about AI/MLEntitys or MLCapabilityUpdateJobs that themselves are associated with AI/MLEntitys for which update is requested and/or executed. Correspondingly, both the MLCapabilityUpdateRequests and the MLCapabilityUpdateJobs are conditionally mandatory in that at least one of them must be associated with an instance of MLCapabilityUpdateReport.

2.3.1.2 Attributes

The MLCapabilityUpdateReport includes the attributes shown in Table 7:

TABLE 7

Attributes of MLCapabilityUpdateReport
(M = Mandatory, CM = Conditional Mandatory, O = optional, T = true, F = false)

| Attribute name | Support Qualifier | isReadable | isWritable | isInvariant | isNotifyable |
|---|---|---|---|---|---|
| MLCapabilityUpdateReportID | M | T | F | F | F |
| MLCapabilityUpdateJobID | M | T | F | F | F |
| AI/MLEntitysList | M | T | F | F | F |
| MLCapabilityUpdateRequests | O | T | F | F | F |
| achievedPerformanceGain | O | T | F | F | T |

2.4 Attribute Definitions

TABLE 8

Attribute definitions

| Attribute Name | Documentation and Allowed Values | Properties |
|---|---|---|
| CapabilityVersions | It indicates the list of available version of AI/ML Capability that can be applied for update | type: list<br>multiplicity: 1<br>isOrdered: N/A<br>isUnique: N/A<br>defaultValue: None |
| expectedPerformanceGains | It indicates the expected performance gain if/when the AI/ML Capability of the respective network function are updated with/to the specific set of newly available AI/ML Capability. | type: list<br>multiplicity: 1<br>isOrdered: N/A<br>isUnique: N/A<br>default Value: None |
| AI/MLEntitysList | It indicates the list of ML Entities available at the MLCapabilityUpdate function | type: String<br>multiplicity: 1<br>isOrdered: N/A<br>isUnique: N/A<br>default Value: None<br>isNullable: True |
| MLCapabilityUpdateJobID | It indicates an identifier for a specific instantiated MLCapabilityUpdate job | type: String<br>multiplicity: 1<br>isOrdered: N/A<br>isUnique: N/A<br>default Value: None<br>isNullable: True |

TABLE 8-continued

| Attribute definitions | | |
|---|---|---|
| Attribute Name | Documentation and Allowed Values | Properties |
| AI/MLEntityID | It indicates an identifier for a specific AI/MLEntity or AI/MLEntity. It may include the version identifiers of any such AI/MLEntity or AI/MLEntity | type: String<br>multiplicity: *<br>isOrdered: False<br>isUnique: True<br>default Value: None<br>isNullable: True |
| newCapabilityVersion | It indicates the specific version of AI/ML Capability to be applied for the update | type: String<br>multiplicity: *<br>isOrdered: False<br>isUnique: True<br>default Value: None<br>isNullable: True |
| performanceGainThreshold | It defines the minimum performance gain as a percentage that shall be achieved with the capability update, i.e., the difference in the performances between the existing capabilities and the new capabilities should be at least performanceGainThreshold otherwise the new capabilities should not be applied.<br>Allowed value: float between 0.0 and 100.0 | type: Float<br>multiplicity: 1<br>isOrdered: N/A<br>isUnique: N/A<br>default Value: None<br>isNullable: False |
| Source | It indicates a managed object that initiates the request for MLCapabilityUpdate | type: String<br>multiplicity: 1<br>isOrdered: N/A<br>isUnique: N/A<br>default Value: None<br>isNullable: True |
| expectedRuntimeContext | It describes the conditions and characteristics of the environment where the AI/MLEntity or AI/MLEntity is expected to be used for inference | type: String<br>multiplicity: *<br>isOrdered: False<br>isUnique: True<br>default Value: None<br>isNullable: True |
| ProgressStatus | It indicates the status of the MLCapabilityUpdate process as evaluated by the MLCapabilityUpdate function. | type: ENUM<br>multiplicity: *<br>isOrdered: False<br>isUnique: True<br>default Value: None<br>isNullable: True |
| MLCapabilityUpdateReportingPeriod | It defines how often the MLCapabilityUpdate may report about the MLCapabilityUpdateRequest or the associated MLCapabilityUpdateJob | type: INTEGER<br>multiplicity: 1<br>isOrdered: N/A<br>isUnique: N/A<br>default Value: None<br>isNullable: True |
| MLCapabilityUpdateReportID | It indicates an identifier for a specific MLCapabilityUpdate report | type: integer<br>multiplicity: 1<br>isOrdered: N/A<br>isUnique: N/A<br>default Value: None<br>isNullable: False |

******* END: Example Embodiment ********

Some example embodiments of the present disclosure aim at fulfilling at least one of the following requirements:

REQ-AI/MLUPDATE-1: the 3GPP management system shall have a capability for the provider of AI/ML inference to inform an authorized consumer of the availability of new AI/ML Capability (e.g., as learning through a training process or as provided via a software update) and the readiness to update the AI/ML Capability of the respective network function (i.e., AI/ML-enabled function) when triggered.

REQ-AI/MLUPDATE-2: the 3GPP management system shall have a capability for the provider of AI/ML inference to inform an authorized consumer of the different versions of newly available AI/ML Capability that are candidates for applying towards updating the AI/ML Capability of a network function i.e., AI/ML-enabled function) when triggered.

REQ-AI/MLUPDATE-3: the 3GPP management system shall have a capability for the provider of AI/ML inference to inform an authorized consumer of the expected performance gain if/when the AI/ML Capability of the respective network function are updated with/to the specific set of newly available AI/ML Capability.

REQ-AI/MLUPDATE-4: the 3GPP management system shall have a capability to allow an authorized consumer to request the provider of AI/ML inference to update its AI/ML Capability without stating the specific AI/ML Entity to be updated.

REQ-AI/MLUPDATE-5: the 3GPP management system shall have a capability to allow an authorized consumer to request the provider of AI/ML inference to update its AI/ML Capability using a specific version of newly available AI/ML Capability.

REQ-AI/MLUPDATE-6: the 3GPP management system shall have a capability to allow an authorized consumer to request the provider of AI/ML inference to update its AI/ML Capability with specific update-trigger conditions e.g., including a specific performance gain that must be met for the respective AI/ML capability update.

REQ-AI/MLUPDATE-7: the 3GPP management system shall have a capability for the provider of AI/ML inference to inform an authorized consumer about of the process or outcomes related to any request for updating the AI/ML Capability.

REQ-AI/MLUPDATE-8: the 3GPP management system shall have a capability for the provider of AI/ML inference to inform an authorized consumer about of the achieved performance gain following the update of the AI/ML Capability of a network function with/to the specific set of newly available AI/ML Capability REQ-AI/MLUPDATE-9: the 3GPP management system shall have a capability for an authorized consumer (e.g., an operator or the function/entity that generated the request for updating the AI/ML Capability) to manage the request and subsequent process, e.g., to suspend, re-activate or cancel the request or process; or to adjust the characteristics of the capability update.

FIG. 10 shows an apparatus according to an example embodiment of the present disclosure. The apparatus may be an update service producer or an element thereof. FIG. 11 shows a method according to an example embodiment of the present disclosure. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for monitoring 110 and means for instructing 120. The means for monitoring 110 and means for instructing 120 may be a monitoring means and instructing means, respectively. The means for monitoring 110 and means for instructing 120 may be a monitor and instructor, respectively. The means for monitoring 110 and means for instructing 120 may be a monitoring processor and instructing processor, respectively.

The means for monitoring 110 monitors whether an update service producer receives, from an update service consumer, a request to update a AI/ML entity (S110). The AI/ML entity influences a network service. The network service may or may not be provided by the update service consumer.

If the update service producer receives the request (S110=yes), the means for instructing 120 instructs a first support function to update the AI/ML capability to an update version (S120).

FIG. 12 shows an apparatus according to an example embodiment of the present disclosure. The apparatus may be an update service consumer or an element thereof. FIG. 13 shows a method according to an example embodiment of the present disclosure. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises means for monitoring 210 and means for requesting 220. The means for monitoring 210 and means for requesting 220 may be a monitoring means and requesting means, respectively. The means for monitoring 210 and means for requesting 220 may be a monitor and requestor, respectively. The means for monitoring 210 and means for requesting 220 may be a monitoring processor and requesting processor, respectively.

The means for monitoring 210 monitors whether a trigger condition is met (S210). The trigger condition is related to at least one of the following:

a network service, wherein the network service is controlled by an AI/ML capability (e.g., a performance gain thereof), or a potential update of the AI/ML capability (e.g., an availability of one or more update versions), or an update history of the AI/ML capability (e.g., a time after the last update request).

The network service may or may not be provided by the update service consumer.

If the trigger condition is met (S210=yes), the means for requesting 220 requests an update service producer to update the AI/ML capability (S220).

FIG. 14 shows an apparatus according to an example embodiment of the present disclosure. The apparatus comprises at least one processor 810, at least one memory 820 storing instructions that, when executed by the at least one processor 810, cause the apparatus at least to perform the method according to at least one of the following figures and related description: FIG. 11 or FIG. 13.

The AI/ML capability may influence the network service by at least one of the following ways:

the AI/ML capability provides analytics used by the network service; or the AI/ML capability meets a decision to be followed by the network service.

The above description mostly refers to an authorized consumer. However, in some example embodiments, the producer (update service producer) may not check the authorization. Checking the authorization is optional. Thus, the consumer may or may not be authorized.

Some example embodiments are explained with respect to a 5G network. However, the present disclosure is not limited to 5G networks. It may be used in other 3 GPP networks such as 4G, 6G, and 7G, or even in non-3GPP networks if corresponding functions are provided.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality. The same applies correspondingly to the terminal.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present disclosure provide, for example, an update service producer or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present disclosure provide, for example, an update service consumer or a component thereof, an apparatus embodying the same, a method for controlling and/or operating the same, and computer program(s) controlling and/or operating the same as well as mediums carrying such computer program(s) and forming computer program product(s).

Implementations of any of the above-described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred example embodiments of the present disclosure. However, it should be noted that the description of the preferred example embodiments is given by way of example only and that various modifications may be made without departing from the scope of the disclosure as defined by the appended claims.

The terms "first X" and "second X" include the options that "first X" is the same as "second X" and that "first X" is different from "second X", unless otherwise specified. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The present disclosure provides a method comprising: monitoring whether an update service producer receives, from an update service consumer, a request to update an artificial intelligence/machine learning capability influencing a network service; and instructing a first support function to update the artificial intelligence/machine learning capability to an update version if the update service producer receives the request.

The invention claimed is:

1. An apparatus comprising:
at least one processor;
at least one memory storing instructions a producer of an artificial intelligence/machine (AI/ML) learning capability management service, the producer associated with an AI/ML-enabled function of a wireless communication network, wherein the instructions, when executed by the at least one processor, cause the apparatus to perform:
providing, to a consumer of the AI/ML learning capability management service of the producer, information on a plurality of newly available versions of an AI/ML learning capability of the AI/ML-enabled function, wherein the AI/ML learning capability influences a network service;
receiving, from the consumer, a request to update the AI/ML learning capability of the AI/ML-enabled function, the request comprising an indication of a newly available version of the plurality of newly available versions of the AI/ML learning capability of the AI/ML-enabled function and an indication of a performance gain threshold for the network service;
determining whether an expected performance gain of the network service due to updating the AI/ML learning capability of the AI/ML-enabled function to the newly available version of the AI/ML learning capability of the AI/ML-enabled function is greater than the performance gain threshold; and instructing, based on determining that the expected performance gain of the network service due to updating the AI/ML learning capability of the AI/ML-enabled function to the newly available version of the AI/ML learning capability of the AI/ML-enabled function is greater than the performance gain threshold, an AI/ML capability update function of the AI/ML-enabled function to update the AI/ML learning capability of the AI/ML learning function to the newly available version of the AI/ML learning capability; and
notifying, based on determining that that the expected performance gain of the network service due to updating the AI/ML learning capability of the AI/ML-enabled function to the newly available version of the AI/ML learning capability of the AI/ML-enabled function is less than or equal to the performance gain threshold, the consumer that the AI/ML learning capability of the AI/ML-enabled function has not been updated to the newly available version of the AI/ML learning capability.

2. The apparatus according to claim 1, wherein the instructions, when executed by the at least one processor, further cause the apparatus to perform:
publishing, for each respective newly available version of the plurality of newly available versions of the AI/ML learning capability of the AI/ML-enabled function, an expected performance gain for the network service, that is expected to be achieved by updating the AI/ML learning capability of the AI/ML-enabled function to the newly available version of the AI/ML learning capability.

3. The apparatus according to claim 1, wherein the instructing comprises instructing the AI/ML capability update function to perform at least one of the following actions:
downloading and installing a set of instructions which is to be used to update the AI AI/ML learning capability of the AI/ML-enabled function to the newly available version of the AI/ML learning capability; or
downloading and applying a set of one or more parameters which is to be used to update the AI AI/ML learning capability of the AI/ML-enabled function to the newly available version of the AI/ML learning capability.

4. The apparatus according to claim 2, wherein the instructions, when executed by the at least one processor, further cause the apparatus to perform:
triggering training of one or more AI/ML models of the AI/ML-enabled function to obtain at the least one of: the set of instructions; or the set of one or more parameters.

5. An apparatus comprising:
at least one processor; and
at least one memory storing instructions a consumer of artificial intelligence/machine (AI/ML) learning capability management service provided by a producer of the AI/ML learning capability management service, wherein the producer is associated with an AI/ML-enabled function of a wireless communication network, wherein the instructions, when executed by the at least one processor, cause the apparatus to perform:
receiving, from the producer, information on a plurality of newly available versions of the AI/ML learning capability of the AI/ML enabled function;
determining whether a trigger condition is met, wherein the trigger condition is related to at least one of the following:

a network service, wherein the network service is influenced by an artificial intelligence/machine (AI/ML) learning capability of the AI/ML-enabled function of the wireless communication network;

a potential update of the AI/ML learning capability of the AI/ML-enabled function; or an update history of the AI/ML learning capability of the AI/ML-enabled function; and in an instance the trigger condition is determined to be met:

sending to the producer, a request to update the AI/ML learning capability of the AI/ML-enabled function to a newly available version of the plurality of newly available versions of the AI/ML learning capability; and receiving, from the producer, a notification whether the AI.ML capability of the AI/ML-enabled function was updated.

6. The apparatus according to claim 5, wherein the trigger condition is met when:

a performance of the network service is less than a performance threshold for the network service; or after requesting a previous update of the AI/ML learning capability of the AI/ML-enabled function, a time period has elapsed which longer than a time threshold.

7. The apparatus according to claim 5, wherein the sending comprises:

selecting the newly available version of the AI/ML capability from among the plurality of newly available versions of the AI/ML learning capability.

8. The apparatus according to claim 7, wherein the selecting comprises: for each respective newly available version of the AI/ML capability of the plurality of newly available versions of the AI/ML learning capability of the AI/ML enabled function:

receiving, from the producer, an expected performance gain of the network service that is expected to be achieved by updating the learning capability of the AI/ML-enabled function to the respective newly available version of the AI/ML capability; and selecting the the newly available version of the from among the plurality of newly available versions of the AI/ML capability based on the expected performance gain achieved by each respective newly available version of the AI/ML capability.

9. The apparatus according to claim 8, wherein the selecting comprises selecting the newly available version of the AI/ML capability from among of the plurality of available versions of the AI/ML capability that maximizes expected performance gain of the network service.

10. The apparatus according to claim 5, wherein the instructions, when executed by the at least one processor, further cause the apparatus to perform at least:

determining a first performance of the network service prior to sending the request to update the AI/ML learning capability of the AI/ML-enabled function;

receiving a response to the request to update the AI/ML learning capability of the AI/ML-enabled function, wherein the response indicates that the AI/ML learning capability of the AI/ML-enabled function is updated to the newly available version of the plurality of newly available versions of the AI/ML learning capability of the AI/ML enabled function;

determining a second performance of the network service after the response is received;

obtaining a performance gain of the network service based on the first performance and the second performance;

reporting, to the producer, the performance gain of the network service.

11. The apparatus according to claim 5, wherein the network service is provided by the AI-ML-enabled function.

12. The apparatus according to claim 5, wherein:

the artificial intelligence/machine learning capability provides analytics to be used by the network service; or the artificial intelligence/machine learning capability meets a decision to be followed by the network service.

13. The apparatus according to claim 5, wherein the request further comprises an indication of a performance gain threshold for the network service.

14. The apparatus according to claim 13, wherein the receiving the notification comprises receiving, from the producer, a notification that the AI/ML capability of the AI/ML-enabled function was not updated and an indication that the AI/ML capability of the AI/ML-enabled function was not updated because an expected performance gain of the network service due to updating the AI/ML learning capability of the AI/ML-enabled function to the newly available version of the AI/ML learning capability of the AI/ML-enabled function is less than or equal to the performance gain threshold for the network service.

15. The apparatus according to claim 13, wherein the receiving the notification comprises receiving, from the producer, a notification that the AI/ML capability of the AI/ML-enabled function was updated and an indication that the AI/ML capability of the AI/ML-enabled function was updated because an expected performance gain of the network service due to updating the AI/ML learning capability of the AI/ML-enabled function to the newly available version of the AI/ML learning capability of the AI/ML-enabled function is greater than the performance gain threshold for the network service.

* * * * *